(12) United States Patent
Do

(10) Patent No.: US 7,768,720 B2
(45) Date of Patent: Aug. 3, 2010

(54) IMAGING LENS

(75) Inventor: Satoshi Do, 1-2-56 Miyado, Asaka-shi, 351-0031, Saitama (JP)

(73) Assignees: Satoshi Do, Saitama (JP); Milestone Co., Ltd., Tokyo (JP)

( * ) Notice: Subject to any disclaimer, the term of this patent is extended or adjusted under 35 U.S.C. 154(b) by 316 days.

(21) Appl. No.: 11/921,174

(22) PCT Filed: Apr. 12, 2007

(86) PCT No.: PCT/JP2007/058042
§ 371 (c)(1),
(2), (4) Date: Nov. 28, 2007

(87) PCT Pub. No.: WO2008/075469
PCT Pub. Date: Jun. 26, 2008

(65) Prior Publication Data
US 2009/0290235 A1    Nov. 26, 2009

(30) Foreign Application Priority Data
Dec. 21, 2006    (JP) .............................. 2006-344222

(51) Int. Cl.
*G02B 9/04* (2006.01)

(52) U.S. Cl. .................. 359/793; 359/755; 359/757

(58) Field of Classification Search .............. 359/757, 359/755, 793
See application file for complete search history.

(56) References Cited

U.S. PATENT DOCUMENTS 5,243,468 A    9/1993    Ohtake
(Continued)

FOREIGN PATENT DOCUMENTS

JP    2001-242308    9/2001
(Continued)

OTHER PUBLICATIONS

Japanese International Search Report (PCT/ISA/210), issued Jul. 17, 2007 for PCT/JP2007/058042.

*Primary Examiner*—Joseph Martinez
*Assistant Examiner*—James R Greece
(74) *Attorney, Agent, or Firm*—Venable LLP; James R. Burdett; Yao Wang

(57) ABSTRACT

An imaging lens of which optical performance does not deteriorate even in a high temperature environment, various aberrations are well corrected, optical length is short, and back focus is sufficiently secured. This imaging lens comprises a first diaphragm $S_1$, a first junction type compound lens 14, a second diaphragm $S_2$ and a second junction type compound lens 16, wherein the first diaphragm, the first junction type compound lens, the second diaphragm, and the second junction type compound lens are arranged in this sequence from an object side to an image side. The first junction type compound lens comprises a first lens $L_1$, a second lens $L_2$ and a third lens $L_3$ arranged in this sequence from the object side to the image side, and the second junction type compound lens comprises a fourth lens $L_4$, a fifth lens $L_5$ and a sixth lens $L_6$ in this sequence from the object side to the image side. The first lens, the third lens, the fourth lens and the sixth lens are formed of a curable resin material. The second lens and the fifth lens are formed of a glass material.

24 Claims, 13 Drawing Sheets

U.S. PATENT DOCUMENTS

| | | | |
|---|---|---|---|
| 5,959,788 | A | 9/1999 | Yamakawa et al. |
| 6,551,530 | B2 | 4/2003 | Koizumi et al. |
| 6,862,804 | B2 | 3/2005 | Nishio et al. |
| 2002/0041450 | A1 | 4/2002 | Katsuma |
| 2002/0041451 | A1 | 4/2002 | Harada |
| 2006/0050399 | A1 | 3/2006 | Nakagawa |

FOREIGN PATENT DOCUMENTS

| | | |
|---|---|---|
| JP | 2001-305309 | 10/2001 |
| JP | 2002-154169 | 5/2002 |
| JP | 2002-154170 | 5/2002 |
| JP | 2002041451 | 11/2002 |
| JP | 2003-311757 | 11/2003 |
| JP | 2004-053834 | 2/2004 |
| JP | 2004-328474 | 11/2004 |
| JP | 2005010197 A * | 1/2005 |
| JP | 2005-067999 | 3/2005 |
| JP | 2005-084273 | 3/2005 |
| JP | 2005-258329 | 9/2005 |
| JP | 2005-305938 | 11/2005 |
| JP | 2005352266 | 12/2005 |
| JP | 2006-121079 | 5/2006 |
| JP | 2006-195053 | 7/2006 |
| JP | 2006-308669 | 11/2006 |
| JP | 2006-323365 | 11/2006 |

* cited by examiner

IMAGING LENS

TECHNICAL FIELD

The present invention relates to an imaging lens, and more particularly to an imaging lens that can be suitably mounted on a portable telephone or the like.

BACKGROUND ART

In a portable telephone with a build-in digital camera, an imaging lens is mounted on a printed circuit board. As a method for mounting an imaging lens on a printed circuit board, a reflow soldering processing is used. Hereafter the reflow soldering processing may simply be called "reflow processing". Reflow processing is a method for soldering an electronic component by placing a solder ball in advance at a location where an electronic component is connected, placing the electronic component there, heating to melt the solder ball, then cooling the solder down.

Generally in mass production steps, a reflow step for performing reflow processing is used as a method for mounting electronic elements or such components as an imaging lens on a printed circuit board. If the reflow step is used, the mounting cost of components on a printed circuit board can be decreased, and the manufacturing quality can be maintained at a predetermined level.

In the reflow step of the manufacturing steps of a portable telephone comprising an imaging lens, not only electronic components are arranged at predetermined positions on a printed circuit board, but also the imaging lens itself and a socket for installing the imaging lens are arranged on the printed circuit board.

The imaging lenses installed in portable telephones are largely made of plastic in order to decrease manufacturing cost and to insure lens performance. Therefore a heat resistant socket component is used for installing the imaging lens, in order to prevent thermal deformation of the imaging lens in a high temperature environment, which makes it impossible to maintain optical performance thereof.

In other words, in the reflow step, a heat resistant socket component for installing an imaging lens is mounted on the printed circuit board of the portable telephone, and the imaging lens is installed in this socket after the reflow step, so that the imaging lens is not exposed to the high temperature in the reflow step (e.g. see Patent Documents 1 to 3). However using a heat resistant socket component for installing the imaging lens makes the manufacturing steps complicated, and increases the manufacturing cost including the cost of this heat resistant socket.

Recently it has been demanded that the optical performance of an imaging lens installed in portable telephone does not deteriorate even if the portable telephone itself is placed in about 150° C. high temperature environment, considering the case of a portable telephone that is left in an automobile which temporarily becomes a high temperature environment. A conventional imaging lens made of plastic material cannot meet this demand.

In order to implement an imaging lens of which optical performance is maintained even in a high temperature environment, forming an imaging lens using a high softening temperature mold glass material is possible (e.g. see Patent Document 4). The temperature at which a high softening temperature mold glass material softens is several hundred degrees or more, so the deterioration of optical performance of an imaging lens in a high temperature environment can be avoided, but at this moment, an imaging lens made of mold glass material is not popular since the manufacturing cost is very high.

In addition to the above thermal characteristics, an imaging lens installed on a portable telephone must satisfy the following conditions related to optical characteristics. One condition is that the optical length must be short. An optical length is a length from an entrance plane at an object side to an image formation plane (also called the "image sensing plane") of the imaging lens. In other words, when a lens is designed, the ratio of the optical length to the composite focal distance of the imaging lens must be minimized. In the case of a portable telephone, for example, this optical length must at least be shorter than the thickness of the portable telephone main unit.

On the other hand, a back focus, which is defined as a distance from the outgoing plane at the image side to the image sensing plane of the imaging lens, should be as long as possible. In other words, when the lens is designed, the ratio of the back focus to the focal distance must be maximized. This is because such components as a filter and cover glass must be inserted between the imaging lens and the image sensing plane.

In addition to this, it is naturally demanded for the imaging lens that various aberrations are corrected to be small enough that the distortion of an image is not visually recognized, and the integration density of the image sensing elements (also called "pixels") is sufficiently satisfied. In other words, various aberrations must be well corrected, and an image when various aberrations are well corrected may hereafter be called a "good image".

Patent Document 1: Japanese Patent Application Laid-Open No. 2006-121079
Patent Document 2: Japanese Patent Application Laid-Open No. 2004-328474
Patent Document 3: Japanese Patent No. 3755149
Patent Document 4: Japanese Patent Application Laid-Open No. 2005-067999

DISCLOSURE OF THE INVENTION

Problems to be solved by the invention

With the foregoing in view, it is an object of the present invention to provide an imaging lens suitable for being installed in a portable telephone, and of which heat resistance is guaranteed and optical performance does not deteriorate, in a reflow step or even if the imaging lens is installed in a portable telephone and is temporarily placed in the highest temperature environment according to design specifications.

It is another object of the present invention to provide an imaging lens of which optical length is short enough to be installed in a portable telephone, and back focus is long enough to allow inserting such components as a filter and cover glass between the imaging lens and image sensing plane, and with which good images are acquired.

Means for Solving the Problems

To achieve the above objects, an imaging lens of this invention comprises a first diaphragm, a first junction type compound lens, a second diaphragm, and a second junction type compound lens, wherein the first diaphragm, the first junction type compound lens, the second diaphragm and the second junction type compound lens are arranged in this sequence from an object side to an image side.

The first junction type compound lens further comprises a first lens, a second lens and a third lens arranged in this sequence from the object side to the image side, and the first lens and the third lens are formed of a curable resin material. The second junction type compound lens further comprises a fourth lens, a fifth lens and a sixth lens arranged in this sequence from the object side to the image side, and the fourth lens and the sixth lens are formed of a curable resin material. The second lens and the fifth lens are formed of a high softening temperature glass material.

Here the curable resin material refers to both a thermosetting resin and a UV-curable resin.

The first lens and the second lens are directly bonded, and the second lens and the third lens are directly bonded.

The fourth lens and the fifth lens are directly bonded, and the fifth lens and the sixth lens are directly bonded.

In the above mentioned imaging lens, it is preferable to perform settings that satisfy the following conditions (1) to (8).

$$0 \leq |N_3 - N_2| \leq 0.1 \quad (1)$$

$$0 \leq |N_3 - N_4| \leq 0.1 \quad (2)$$

$$0 \leq |\nu_3 - \nu_2| \leq 30.0 \quad (3)$$

$$0 \leq |\nu_3 - \nu_4| \leq 30.0 \quad (4)$$

$$0 \leq |N_9 - N_8| \leq 0.1 \quad (5)$$

$$0 \leq |N_9 - N_{10}| \leq 0.1 \quad (6)$$

$$0 \leq |\nu_9 - \nu_8| \leq 30.0 \quad (7)$$

$$0 \leq |\nu_9 - \nu_{10}| \leq 30.0 \quad (8)$$

where $N_2$: refractive index of the first lens
$N_3$: refractive index of the second lens
$N_4$: refractive index of the third lens
$\nu_2$: Abbe number of the first lens
$\nu_3$: Abbe number of the second lens
$\nu_4$: Abbe number of the third lens
$N_8$: refractive index of the fourth lens
$N_9$: refractive index of the fifth lens
$N_{10}$: refractive index of the sixth lens
$\nu_8$: Abbe number of the fourth lens
$\nu_9$: Abbe number of the fifth lens
$\nu_{10}$: Abbe number of the sixth lens The second lens and the fifth lens can be plane parallel glass plates. A plane parallel glass plate can also be called an "optical-parallel glass plate". A plane parallel glass plate normally is not called a lens, but in the description of the present invention, the plane parallel glass plate may be included in a lens definition, regarding this as a special case where the radius of the curvature of the lens surface is infinite.

When the second lens and the fifth lens are plane parallel glass plates, the first lens can be a plano-convex lens where the object side face of the first lens is a convex surface facing the object side on a paraxial line, the third lens can be a plano-concave lens where the image side face of the third lens is a concave plane facing the image side on a paraxial line, the fourth lens can be a plano-convex lens where the object side face of the fourth lens is a convex surface facing the object side on a paraxial line, and the sixth lens is a plano-concave lens where the image side face of the sixth lens is a concave surface facing the image side on a paraxial line.

The second lens can be a bi-convex lens, the first lens can be a lens where the object side face of the first lens is a convex surface facing the object side on a paraxial line, the third lens can be a lens where the image side face of the third lens is a concave surface facing the image side on a paraxial line, the fifth lens can be a bi-concave lens, the fourth lens can be a lens where the object side face of the fourth lens is a convex surface facing the object side on a paraxial line, and the sixth lens can be a lens where the image side face of the sixth lens is a concave surface facing the image side on a paraxial line.

The second lens can be a meniscus lens of which convex surface is facing the object side of the second lens, the first lens can be a lens where the object side face the first lens is a convex surface facing the object side on a paraxial line, the third lens can be a lens where the image side face of the third lens is a concave surface facing the image side on a paraxial line, the fifth lens can be a meniscus lens of which convex plane faces the image side of the fifth lens, the fourth lens can be a lens where the object side face on the fourth lens is a convex surface facing the object side on a paraxial line, and the sixth lens can be a lens where the image side face of the sixth lens is a concave surface facing the image side on a paraxial line.

The second lens can be a bi-concave lens, the first lens can be a lens where the object side face of the first lens is a convex surface facing the object side on a paraxial line, the third lens can be a lens where the image side face of the third lens is a concave surface facing the image side on a paraxial line, the fifth lens can be a bi-convex lens, the fourth lens can be a lens where the object side face of the fourth lens is a convex surface facing the object side on a paraxial line, and the sixth lens can be a lens where the image side face of the sixth lens is a concave surface facing the image side on a paraxial line.

To form the imaging lens of the present invention, it is preferable that the object side face of the first lens and the image side face of the third lens are aspheric, and the object side face of the fourth lens and the image side face of the sixth lens are aspheric.

To form the imaging lens of the present invention, it is preferable that the curable resin material, which is a material of the first lens, third lens, fourth lens and sixth lens, is a transparent curable silicone resin containing a transparent adhesive. Transparent indicates that the light absorption of visible light is small (transparent) enough to have no influence on practical use.

EFFECTS OF THE INVENTION

According to the imaging lens of the present invention, in the first junction type compound lens constituting this imaging lens, the first and the third lenses, which are formed of curable resin material, sandwich and are directly bonded to the second lens, which is formed of a high softening temperature glass material, from both sides. In the second junction type compound lens, the fourth and the sixth lenses, which are formed of a curable resin material, sandwich and are directly bonded to the fifth lens, which is formed of a high softening temperature glass material, from both sides. Here the high softening temperature glass material refers to a glass material of which softening temperature is higher than both the temperature during reflow processing and the maximum ambient temperature in the design specifications of the junction type compound lens. In the following description, the glass material refers to the high softening temperature glass material when the thermal characteristics are described, and the optical glass material when the optical characteristics are described.

The curable resin material does not become soft once the curing processing is performed, even if temperature becomes higher than a predetermined temperature. If exposed to a predetermined temperature, referred to as the "softening temperature" (also called "glass-transition temperature"), the curable resin material softens and becomes plasticized. This nature is different from such plasticizing resin material as plastic material. In other words, once the curing process is performed and the material solidifies, the curable resin material does not change its geometric shape.

Therefore the geometric shape of the first lens, third lens, fourth lens and sixth lens does not change, and the optical performance thereof does not deteriorate even if placed in a high temperature environment. The optical performance of the second lens and the fifth lens does not deteriorate either even if placed in a high temperature environment, since they are formed of high softening temperature glass material. The high temperature environment here refers to a temperature environment of which temperature is higher than both the temperature during reflow processing and the maximum temperature in the design specifications of the junction type compound lens.

Therefore the optical performance of the first junction type compound lens and the second junction type compound lens is guaranteed in the reflow step, even in a high temperature environment at maximum temperature which can be expected when using an imaging lens.

If a single lens is created using only curable resin, such a problem as a change in the curved surface shape of the lens occurs during the curing process. However the first lens and the second lens are directly bonded, and the second lens and the third lens are directly bonded. The fourth lens and the fifth lens are directly bonded, and the fifth lens and the sixth lens are directly bonded. In other words, the first lens and the third lens sandwich and are directly bonded to the second lens formed of a high softening temperature glass material from both sides, and the fourth lens and the sixth lens sandwich and are directly bonded to the fifth lens formed of a high softening temperature glass material from both sides. Therefore such a problem as deformation of the curved surface shape of the first lens, third lens, fourth lens and sixth lens during the curing process does not occur.

Here direct bonding refers to bonding a lens A and a lens B intentionally without intervening anything between lens A and lens B, except in a case when such an intervention is unavoidable. Lens A and Lens B correspond to the first lens and the second lens respectively, for example. This is the same for each combination of the second and third lens, the fourth and fifth lens, and the fifth and sixth lens.

Now the optical characteristics of the imaging lens will be described.

The optical structural principle of the imaging lens of the present invention implements two roles, that is aberration correction and image formation, by a single junction type compound lens of which optical characteristics such as a refractive index is as uniform as possible. In other words, it is preferable that the respective refractive index and Abbe number of the first to third lenses constituting the first junction type compound lens do not differ very much from each other. It is also preferable that the respective refractive index and the Abbe number of the fourth to sixth lenses constituting the second junction type compound lens do not differ very much from each other. In other words, it is ideal that the respective refractive index and Abbe number of the first to third lenses are the same as each other. It is also ideal that the respective refractive index and Abbe number of the fourth to sixth lenses are the same as each other. However in reality it is extremely difficult to determine the combination of an optical glass material and a curable resin material with which the refractive index and the Abbe number of the lenses become perfectly the same.

Therefore the inventor of the present invention checked, through various simulations and prototyping, the difference of the refractive indexes and Abbe numbers between the optical glass material and the curable resin material, which could generate good images in the first and second junction type compound lenses respectively. As a result, it was confirmed that good images can be acquired by constructing an imaging lens with satisfying the above conditions (1) to (8).

In other words, if the difference between the refractive index $N_2$ of the first lens and the refractive index $N_3$ of the second lens, the difference between the refractive index $N_3$ of the second lens and the refractive index $N_4$ of the third lens, the difference between the refractive index $N_8$ of the fourth lens and the refractive index $N_8$ of the fifth lens, and the difference between the refractive index $N_9$ of the fifth lens and the refractive index $N_{10}$ of the sixth lens are within 0.1 respectively, then the distortion aberration, astigmatism aberration and chromatic/spherical aberration become sufficiently small enough to generate good images.

If the difference between the Abbe number $v_2$ of the first lens and the Abbe number $v_3$ of the second lens, the Abbe number $v_3$ of the second lens and the Abbe number $v_4$ of the third lens, the difference between the Abbe number $v8$ of the fourth lens and the Abbe number $v_9$ of the fifth lens and the Abbe number $v_9$ of the fifth lens and the Abbe number $v_{10}$ of the sixth lens are within 30.0 respectively, then the value of the chromatic aberration can be small enough to generate good images, and images can have sufficient contrast.

As shown by the following embodiments, an imaging lens of which optical length is short enough to be allowed to be installed in a portable telephone, the back focus is long enough to allow inserting such components as a filter and a cover glass between the imaging lens and the image sensing plane, and with which good images can be acquired, can be implemented by satisfying the above conditions (1) to (8).

EXPLANATION OF REFERENCE SYMBOLS

| | |
|---|---|
| 10 | Image sensing element |
| 12 | Cover glass |
| 14 | First junction type compound lens |
| 16 | Second junction type compound lens |
| 20, 30 | Die |
| 24, 34 | Transparent curable silicone resin |
| 26 | Optical glass |
| 36 | Object side face of first lens |
| 38 | Image side face of third lens |
| $S_1$ | First diaphragm |
| $S_2$ | Second diaphragm |
| $L_1$ | First lens |
| $L_2$ | Second lens |
| $L_3$ | Third lens |
| $L_4$ | Fourth lens |
| $L_5$ | Fifth lens |
| $L_6$ | Sixth lens |

BEST MODE FOR CARRYING OUT THE INVENTION

Embodiments of the present invention will now be described with reference to the drawings. Each drawing, however, simply illustrates one configuration example of the present invention, and roughly shows a cross-section of each composing element and positional relationship in order to assist in the understanding of the present invention, and does not limit the present invention to the illustrated example.

In the following description, specific materials and conditions may be used, but these materials and conditions are merely examples of preferred embodiments, and therefore the present invention is not limited in any way by these materials and conditions.

Figure 1:
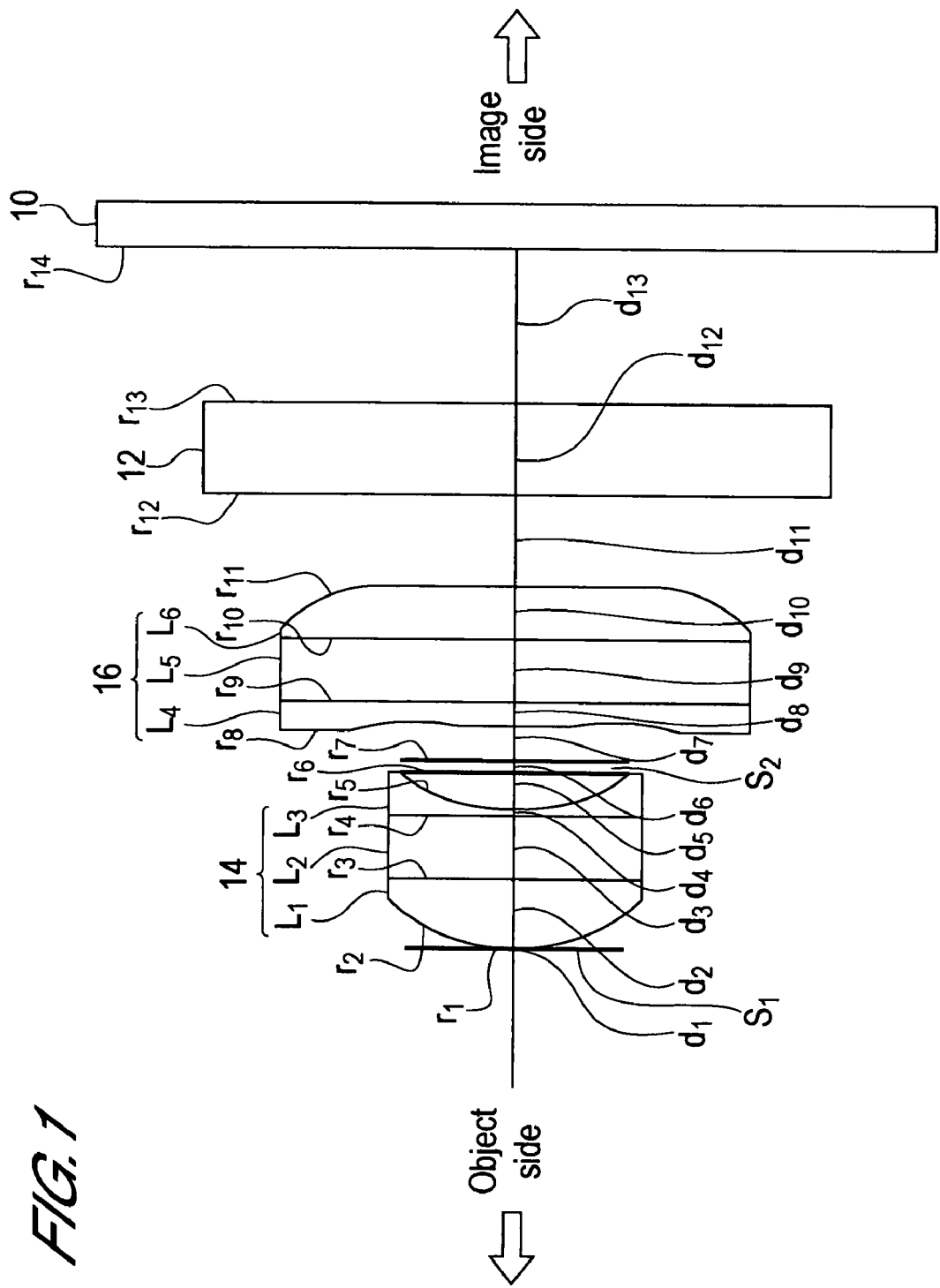
FIG. 1 is a cross-sectional view depicting an imaging lens according to the present invention.

FIG. 1 is a diagram depicting a configuration of an imaging lens of the present invention. The symbols of the surface number ($r_i$ (i=1, 2, 3, . . . , 14)) and the surface spacing ($d_i$ (i=1, 2, 3, . . . , 13)) defined in FIG. 1 are omitted in FIG. 2, FIG. 6, FIG. 10, FIG. 14 and FIG. 18, so that the drawing does not become complicated.

As FIG. 1 shows, a first, second and third lens constituting a first junction type compound lens 14 are denoted with $L_1$, $L_2$ and $L_3$ respectively. A fourth, fifth and sixth lens constituting a second junction type compound lens 16 are denoted with $L_4$, $L_5$ and $L_6$ respectively.

A first diaphragm $S_1$ disposed on the front face of the first junction type compound lens 14 (front face $r_2$ of the first lens) plays a role of an aperture stop, and defines a position of an entrance pupil. And second diaphragm $S_2$ disposed between the first junction type compound lens 14 and the second junction type compound lens 16 plays a role of preventing a flare, which is a phenomena where the contrast of an image decreases, or a smear which is a phenomena where the image smears.

Within a range where no misunderstanding is caused, $r_i$ (i=1, 2, 3, . . . , 14) may be used as a variable that indicates a value of a radius of curvature on an optical axis, or a symbol that identifies a lens, cover glass face or image sensing plane (e.g. $r_2$ is used to indicate the object side face of the first lens $L_1$ constituting the first junction type composite lens 14).

Table 1 to Table 5 show the specific values of these parameters, such as $r_i$ (i=1, 2, 3, . . . , 14) and $d_i$ (i=1, 2, 3, . . . , 13) shown in the drawings. The suffix i is added corresponding to a diaphragm (first and second), surface number of each lens or thickness of the lens, or the surface spacing of the lens sequentially from the object side to the image side.

$r_i$ is a radius of curvature on the optical axis on the i-th surface.

$d_i$ is a distance from the i-th surface to the (i+1) surface.

$N_i$ is a refractive index of the material of the lens having the i-th surface and (i+1)th surface.

$v_i$ is an Abbe number of the material of the lens having the i-th surface and (i+1)th surface.

In FIG. 1, the aperture of the diaphragm (first and second) is shown by a segment. This is because the intersection of the diaphragm surface and the optical axis must be clearly shown to define the distance from the lens surface to the diaphragm surface. In FIG. 2, FIG. 6, FIG. 10, FIG. 14 and FIG. 18, which are cross-sectional views of the imaging lenses of the first embodiment to the fifth embodiment respectively, a main body of the diaphragm for shielding light is shown by a half line of which the start point is the edge of the aperture, by opening the aperture of the diaphragm, which is unlike FIG. 1. This is because the status of the diaphragm must be shown by opening the aperture of the diaphragm in order to enter such a beam as a main beam. In the second diaphragm, the thickness is shown by $d_6$, since the thickness thereof cannot be ignored in the structure of the imaging lens.

The optical length L is a distance from the first diaphragm $S_1$ to the image sensing plane. The back focus bf is a distance from the image side surface of the sixth lens $L_6$ constituting the second junction type compound lens 16 to the image sensing plane. Here the length from the image side face of the sixth lens $L_6$ to the image sensing plane, which is measured without a cover glass, is regarded as the back focus bf.

Aspherical data is shown in Table 1 to Table 5 respectively with surface numbers. The value $r_i$ (i=1, 2, 3, . . . , 14) of the radius of curvature on the optical axis is a positive value if it is convex to the object side, and is a negative value if it is convex to the image side.

Both surfaces ($r_3$ and $r_4$) when the second lens is a plane parallel glass plate, both surfaces ($r_9$ and $r_{10}$) when the fifth lens is a plane parallel glass plate, first diaphragm S ($r_1$), second diaphragms ($r_6$, $r_7$) and surfaces of the cover glass (or filter) ($r_{12}$ and $r_{13}$) are planes, so the radius of the curvature is indicated as ∞. The image sensing plane ($r_{14}$) is a plane, so $r_{14}=\infty$, but this is omitted in Table 1 to Table 5.

The aspherical surface used for this invention is given by the following expression.

$$Z=ch^2/[1+[1-(1+k)c^2h^2]^{+1/2}]+A_0h^4+B_0h^6+C_0h^8+D_0h^{10}$$

where

Z: depth from the vertex of the surface to the contact surface c: curvature of the surface on the optical axis
h: height from the optical axis
k: cone constant
$A_0$: aspherical surface coefficient of degree 4
$B_0$: aspherical surface coefficient of degree 6
$C_0$: aspherical surface coefficient of degree 8
$D_0$: aspherical surface coefficient of degree 10

In Table 1 to Table 5 of this description, the numeric value to indicate an aspherical surface coefficient is denoted by an exponent, and "e−1", for example, means "the −1th power of 10". The value indicated as the focal distance f is a composite focal distance of the first junction type compound lens and the second junction type compound lens. For each embodiment, the open F number (also called open F value), which is an index of the brightness of the lens, is indicated by Fno. The open F number refers to the F number when the diameter of the aperture stop (first diaphragm) is the maximum by design. The diagonal length 2Y of the square image surface is indicated as the image height. Y is a value half of the diagonal length of the square image surface.

Now the imaging lens according to the first embodiment the fifth embodiment will be described with reference to FIG. 2 to FIG. 21.

The distortion aberration curves shown in FIG. 3, FIG. 7, FIG. 11, FIG. 15 and FIG. 19 show the aberration (unsatisfactory quantity of the tangent condition is shown in the abscissa by percentage) with respect to the distance from the optical axis (shown in the ordinate by percentage with the maximum distance from the optical axis within the image surface as 100). The astigmatism aberration curves shown in FIG. 4, FIG. 8, FIG. 12, FIG. 16 and FIG. 20 show the aberration quantity (mm units) in the abscissa with respect to the distance from the optical axis (%) shown in the ordinate, just like the distortion aberration curves, and show the aberration quantities (mm units) on the meridional surface and the sagittal surface respectively.

The chromatic/spherical aberration curves in FIG. 5, FIG. 9, FIG. 13, FIG. 17 and FIG. 21 show the aberration quantity (mm units) in the abscissa with respect to the incident height h in the ordinate. The incident height h in the ordinate is shown as a value converted into an F number. For example, in the case of a lens of which Fno is 2.9, the incident height h=100% of the ordinate corresponds to F=2.9.

For the chromatic/spherical aberration curves, the aberration values with respect to the C-line (light of which wavelength is 656.3 nm), d-line (light of which wavelength is 587.6 nm), e-line (light of which wavelength is 546.1 nm), F-line (light of which wavelength is 486.1 nm) and g-line (light of which wavelength is 435.8 nm) are shown.

Table 1 to Table 5 show the list of the radius of curvature (mm units), lens surface spacing (mm units), refractive index of lens material, Abbe number of lens material, focal distance, F number and aspherical surface coefficient of composing lenses of the first embodiment to the fifth embodiment respectively. The radius of curvature on the optical axis and the lens surface spacing of the composing lens are shown as values when the value of the composite focal distance f of the imaging lens is normalized to 1.00 mm.

In the first embodiment to the fifth embodiment, a transparent curable silicone resin, which is a curable resin material, is used for the material of the first lens $L_1$ and the third lens $L_3$ constituting the first junction type compound lens 14 and the material of the fourth lens $L_4$ and the sixth lens $L_6$ constituting the second junction type compound lens 16. An optical glass BK 7, which is a glass material, is used for the material of the second lens $L_2$ and the fifth lens $L_5$. Here BK 7 is a name assigned by Schott Glass Co. to a group of borosilicate glass. The optical glass BK 7 is now manufactured by a plurality of glass manufacturers. The refractive index and the Abbe number of the commercially available optical glass BK 7 are somewhat different depending on the manufacturer and the manufacturing lot. The refractive index of the optical glass BK 7 (made by Ohara Inc.) constituting the second lens $L_2$ and the fifth lens $L_5$ with respect to the d-line (light with a 587.6 nm wavelength) is 1.5168 and the Abbe number is 61.0.

The curable resin material here refers to both a thermosetting resin material and a UV-curable resin material.

The transparent curable silicone resin refers to a silicone resin which is transparent to visible light and with which the geometric shape of a lens does not change, and the optical performance thereof does not deteriorate even if the environment temporarily becomes about a 150° C. high temperature. The transparent curable silicone resin can be selected from appropriate silicone resins commercially available with the description "transparent high hardness silicone resin" in products on the market from silicone resin supply companies.

The first lens $L_1$ and the second lens $L_2$ are directly bonded, and the second lens $L_2$ and the third lens $L_3$ are directly bonded. The fourth lens $L_4$ and the fifth lens $L_5$ are directly bonded, and the fifth lens $L_5$ and the sixth lens $L_6$ are directly bonded.

For the curable resin material of the first lens $L_1$, third lens $L_3$, fourth lens $L_4$ and sixth lens $L_6$, the thermo-setting silicone resins SMX-7852 made by Fuji Polymer Industries Co., Ltd. and SR-7010 made by Dow Corning Toray Co., Ltd. were used. The refractive index and the Abbe number of these thermo-setting silicone resins differ depending on the manufacturing company, and are somewhat different even if the product name is the same. In the following embodiment, the refractive index of the lens material is a value with respect to the d-line (light with 587.6 nm wavelength).

As FIG. 1 shows, the imaging lens of the present invention comprises the first diaphragm $S_1$, the first junction type compound lens 14, the second diaphragm $S_2$ and the second junction type compound lens 16, and are arranged in the sequence of the first diaphragm $S_1$, the first junction type compound lens 14, the second diaphragm $S_2$ and the second junction type compound lens 16 from the object side to the image side.

In the first junction type compound lens 14, the first lens $L_1$, the second lens $L_2$ and the third lens $L_3$ are arranged in this sequence from the object side to the image side. In the second junction type compound lens 16, the fourth lens $L_4$, the fifth lens $L_5$ and the sixth lens $L_6$ are arranged in this sequence from the object side to the image side.

A cover glass 12 is inserted between the second junction type compound lens 16 and the image sensing element 10. A material of the cover glass is optical glass BK 7 (made by Hoya Corporation) of which refractive index is 1.51680 and the Abbe number is 61.0.

Table 1 to Table 5 shows the value $r_i$ (i=1, 2, 3, . . . , 14) of the radius of curvature on the optical axis, surface spacing $d_i$ (i=1, 2, 3, . . . , 13), and refractive index, Abbe number and aspherical surface coefficient of the lens composing material of the imaging lens according to the first embodiment to the fifth embodiment respectively. Here the composite focal distance of the first junction type compound lens and the second junction type compound lens is normalized to 1.00 mm.

The object side face of the first lens $L_1$ and the image side face of the third lens $L_3$ constituting the first junction type compound lens 14 have spherical surfaces, and the object side face of the fourth lens $L_4$ and the image side face of the sixth lens $L_6$ constituting the second junction type compound lens 16 have aspherical surfaces.

TABLE 1

First Embodiment

| Radius of Curvature($r_i$) | Interval($d_i$) | Refractive Index($N_i$) | Abbe Number($\nu_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.291$ | | | | $-2.040\text{e}{-1}$ | $3.890\text{e}{-1}$ | $-1.340\text{e}{+1}$ | $1.868\text{e}{+3}$ | $-1.553\text{e}{+4}$ |
| | $d_2 = 0.1096$ | $N_2 = 1.51000$ | $\nu_2 = 56.0$ | | | | | |
| $r_3 = \infty$ | | | | | | | | |
| | $d_3 = 0.0975$ | $N_3 = 1.51680$ | $\nu_3 = 61.0$ | | | | | |
| $r_4 = \infty$ | | | | | | | | |
| | $d_4 = 0.0122$ | $N_4 = 1.51000$ | $\nu_4 = 56.0$ | | | | | |
| $r_5 = 0.394$ | | | | $-1.220\text{e}{+1}$ | $2.600\text{e}{+1}$ | $-1.826\text{e}{+2}$ | $-3.062\text{e}{+3}$ | $2.490\text{e}{+5}$ |
| | $d_5 = 0.0560$ | | | | | | | |
| $r_6 = \infty$ | | | | | | | | |
| | $d_6 = 0.0210$ | | | | | | | |
| $r_7 = \infty$ | | | | | | | | |
| | $d_7 = 0.0526$ | | | | | | | |
| $r_8 = 1.331$ | | | | $-1.650\text{e}{+1}$ | $-2.590$ | $-7.740\text{e}{+1}$ | $-3.630\text{e}{+2}$ | $1.032\text{e}{+4}$ |
| | $d_8 = 0.0390$ | $N_8 = 1.51000$ | $\nu_8 = 56.0$ | | | | | |
| $r_9 = \infty$ | | | | | | | | |
| | $d_9 = 0.0975$ | $N_9 = 1.51680$ | $\nu_9 = 61.0$ | | | | | |
| $r_{10} = \infty$ | | | | | | | | |
| | $d_{10} = 0.0853$ | $N_{10} = 1.51000$ | $\nu_{10} = 56.0$ | | | | | |
| $r_{11} = 7.500$ | | | | $-1.000\text{e}{+5}$ | $1.800$ | $-6.800\text{e}{+1}$ | $3.840\text{e}{+2}$ | $-1.358\text{e}{+3}$ |
| | $d_{11} = 0.1437$ | | | | | | | |
| $r_{12} = \infty$ | | | | | | | | |
| | $d_{12} = 0.1462$ | $N_{12} = 1.51680$ | $\nu_{12} = 61.0$ | | | | | |
| $r_{13} = \infty$ | | | | | | | | |
| | $d_{13} = 0.2523$ | | | | | | | |

Focal Distance f = 1.00 mm
F-Number $F_{no}$ = 2.9
Image Height 2Y = 1.246 mm

TABLE 2

Second Embodiment

| Radius of Curvature($r_i$) | Interval($d_i$) | Refractive Index($N_i$) | Abbe Number($\nu_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.304$ | | | | $-2.040\text{e}{-1}$ | $3.400\text{e}{-1}$ | $-1.070\text{e}{+1}$ | $1.365\text{e}{+3}$ | $-1.037\text{e}{+4}$ |
| | $d_2 = 0.1147$ | $N_2 = 1.53000$ | $\nu_2 = 35.0$ | | | | | |
| $r_3 = \infty$ | | | | | | | | |
| | $d_3 = 0.1019$ | $N_3 = 1.51680$ | $\nu_3 = 61.0$ | | | | | |
| $r_4 = \infty$ | | | | | | | | |
| | $d_4 = 0.0127$ | $N_4 = 1.53000$ | $\nu_4 = 35.0$ | | | | | |
| $r_5 = 0.412$ | | | | $-1.220\text{e}{+1}$ | $2.273\text{e}{+1}$ | $-1.460\text{e}{+2}$ | $-2.237\text{e}{+3}$ | $1.663\text{e}{+5}$ |
| | $d_5 = 0.0586$ | | | | | | | |
| $r_6 = \infty$ | | | | | | | | |
| | $d_6 = 0.0219$ | | | | | | | |
| $r_7 = \infty$ | | | | | | | | |
| | $d_7 = 0.0550$ | | | | | | | |
| $r_8 = 1.392$ | | | | $-1.650\text{e}{+1}$ | $-2.266$ | $-6.190\text{e}{+1}$ | $-2.650\text{e}{+2}$ | $6.890\text{e}{+3}$ |
| | $d_8 = 0.0408$ | $N_8 = 1.53000$ | $\nu_8 = 35.0$ | | | | | |
| $r_9 = \infty$ | | | | | | | | |
| | $d_9 = 0.1019$ | $N_9 = 1.51680$ | $\nu_9 = 61.0$ | | | | | |
| $r_{10} = \infty$ | | | | | | | | |
| | $d_{10} = 0.0892$ | $N_{10} = 1.53000$ | $\nu_{10} = 35.0$ | | | | | |
| $r_{11} = 7.844$ | | | | $-1.009\text{e}{+5}$ | $1.571$ | $-5.440\text{e}{+1}$ | $2.807\text{e}{+2}$ | $-9.069\text{e}{+2}$ |
| | $d_{11} = 0.1503$ | | | | | | | |
| $r_{12} = \infty$ | | | | | | | | |
| | $d_{12} = 0.1529$ | $N_{12} = 1.51680$ | $\nu_{12} = 61.0$ | | | | | |
| $r_{13} = \infty$ | | | | | | | | |
| | $d_{13} = 0.2224$ | | | | | | | |

Focal Distance f = 1.00 mm
F-Number $F_{no}$ = 2.9
Image Height 2Y = 1.238 mm

TABLE 3

Third Embodiment

| Radius of Curvature($r_i$) | Interval($d_i$) | Refractive Index($N_i$) | Abbe Number($v_i$) | \multicolumn{5}{c}{Aspherical Surface Coefficients} |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.291$ | | | | $-2.040e-1$ | $3.870e-1$ | $-1.330e+1$ | $1.849e+3$ | $-1.532e+4$ |
| | $d_2 = 0.1098$ | $N_2 = 1.51000$ | $v_2 = 56.0$ | | | | | |
| $r_3 = 1.952$ | | | | | | | | |
| | $d_3 = 0.0976$ | $N_3 = 1.51680$ | $v_3 = 61.0$ | | | | | |
| $r_4 = -1.952$ | | | | | | | | |
| | $d_4 = 0.0122$ | $N_4 = 1.51000$ | $v_4 = 56.0$ | | | | | |
| $r_5 = 0.394$ | | | | $-1.220e+1$ | $2.590e+1$ | $-1.810e+2$ | $-3.031e+3$ | $2.457e+5$ |
| | $d_5 = 0.0561$ | | | | | | | |
| $r_6 = \infty$ | | | | | | | | |
| | $d_6 = 0.0210$ | | | | | | | |
| $r_7 = \infty$ | | | | | | | | |
| | $d_7 = 0.0527$ | | | | | | | |
| $r_8 = 1.333$ | | | | $-1.650e+1$ | $-2.580$ | $-7.690e+1$ | $-3.600e+2$ | $1.019e+4$ |
| | $d_8 = 0.0390$ | $N_8 = 1.51000$ | $v_8 = 56.0$ | | | | | |
| $r_9 = -1.952$ | | | | | | | | |
| | $d_9 = 0.0778$ | $N_9 = 1.51680$ | $v_9 = 61.0$ | | | | | |
| $r_{10} = 1.952$ | | | | | | | | |
| | $d_{10} = 0.1052$ | $N_{10} = 1.51000$ | $v_{10} = 56.0$ | | | | | |
| $r_{11} = 7.511$ | | | | $-1.009e+5$ | $1.790$ | $-6.750e+1$ | $3.803e+2$ | $-1.340e+3$ |
| | $d_{11} = 0.1439$ | | | | | | | |
| $r_{12} = \infty$ | | | | | | | | |
| | $d_{12} = 0.1464$ | $N_{12} = 1.51680$ | $v_{12} = 61.0$ | | | | | |
| $r_{13} = \infty$ | | | | | | | | |
| | $d_{13} = 0.2505$ | | | | | | | |

Focal Distance f = 1.00 mm
F-Number $F_{no}$ = 2.9
Image Height 2Y = 1.200 mm

TABLE 4

Fourth Embodiment

| Radius of Curvature($r_i$) | Interval($d_i$) | Refractive Index($N_i$) | Abbe Number($v_i$) | \multicolumn{5}{c}{Aspherical Surface Coefficients} |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.291$ | | | | $-2.040e-1$ | $3.880e-1$ | $-1.340e+1$ | $1.862e+3$ | $-1.546e+4$ |
| | $d_2 = 0.1097$ | $N_2 = 1.51000$ | $v_2 = 56.0$ | | | | | |
| $r_3 = 1.950$ | | | | | | | | |
| | $d_3 = 0.0975$ | $N_3 = 1.51680$ | $v_3 = 61.0$ | | | | | |
| $r_4 = 1.950$ | | | | | | | | |
| | $d_4 = 0.0122$ | $N_4 = 1.51000$ | $v_4 = 56.0$ | | | | | |
| $r_5 = 0.394$ | | | | $-1.220e+1$ | $2.600e+1$ | $-1.820e+2$ | $-3.050e+3$ | $2.480e+5$ |
| | $d_5 = 0.0560$ | | | | | | | |
| $r_6 = \infty$ | | | | | | | | |
| | $d_6 = 0.0210$ | | | | | | | |
| $r_7 = \infty$ | | | | | | | | |
| | $d_7 = 0.0527$ | | | | | | | |
| $r_8 = 1.332$ | | | | $-1.650e+1$ | $-2.590$ | $-7.720e+1$ | $-3.620e+2$ | $1.030e+4$ |
| | $d_8 = 0.0390$ | $N_8 = 1.51000$ | $v_8 = 56.0$ | | | | | |
| $r_9 = -1.950$ | | | | | | | | |
| | $d_9 = 0.1365$ | $N_9 = 1.51680$ | $v_9 = 61.0$ | | | | | |
| $r_{10} = -1.950$ | | | | | | | | |
| | $d_{10} = 0.0463$ | $N_{10} = 1.51000$ | $v_{10} = 56.0$ | | | | | |
| $r_{11} = 7.504$ | | | | $-1.010e+5$ | $1.790$ | $-6.790e+1$ | $3.830e+2$ | $-1.350e+3$ |
| | $d_{11} = 0.1437$ | | | | | | | |
| $r_{12} = \infty$ | | | | | | | | |
| | $d_{12} = 0.1463$ | $N_{12} = 1.51680$ | $v_{12} = 61.0$ | | | | | |
| $r_{13} = \infty$ | | | | | | | | |
| | $d_{13} = 0.2524$ | | | | | | | |

Focal Distance f = 1.00 mm
F-Number $F_{no}$ = 2.9
Image Height 2Y = 1.200 mm

TABLE 5

Fifth Embodiment

| Radius of Curvature($r_i$) | Interval($d_i$) | Refractive Index($N_i$) | Abbe Number($v_i$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.290$ | | | | −2.040e−1 | 3.910e−1 | −1.350e+1 | 1.894e+3 | −1.580e+4 |
| | $d_2 = 0.1094$ | $N_2 = 1.51000$ | $v_2 = 56.0$ | | | | | |
| $r_3 = -1.946$ | | | | | | | | |
| | $d_3 = 0.0973$ | $N_3 = 1.51680$ | $v_3 = 61.0$ | | | | | |
| $r_4 = 1.946$ | | | | | | | | |
| | $d_4 = 0.0122$ | $N_4 = 1.51000$ | $v_4 = 56.0$ | | | | | |
| $r_5 = 0.393$ | | | | −1.220e+1 | 2.620e+1 | −1.840e+2 | −3.104e+3 | 2.534e+5 |
| | $d_5 = 0.0559$ | | | | | | | |
| $r_6 = \infty$ | | | | | | | | |
| | $d_6 = 0.0209$ | | | | | | | |
| $r_7 = \infty$ | | | | | | | | |
| | $d_7 = 0.0525$ | | | | | | | |
| $r_8 = 1.329$ | | | | −1.650e+1 | −2.610 | −7.820e+1 | −3.680e+2 | 1.050e+4 |
| | $d_8 = 0.0389$ | $N_8 = 1.51000$ | $v_8 = 56.0$ | | | | | |
| $r_9 = 1.946$ | | | | | | | | |
| | $d_9 = 0.1362$ | $N_9 = 1.51680$ | $v_9 = 61.0$ | | | | | |
| $r_{10} = -1.946$ | | | | | | | | |
| | $d_{10} = 0.0462$ | $N_{10} = 1.51000$ | $v_{10} = 56.0$ | | | | | |
| $r_{11} = 7.485$ | | | | −1.010e+5 | 1.810 | −6.870e+1 | 3.890e+2 | −1.382e+3 |
| | $d_{11} = 0.1434$ | | | | | | | |
| $r_{12} = \infty$ | | | | | | | | |
| | $d_{12} = 0.1459$ | $N_{12} = 1.51680$ | $v_{12} = 61.0$ | | | | | |
| $r_{13} = \infty$ | | | | | | | | |
| | $d_{13} = 0.2544$ | | | | | | | |

Focal Distance f = 1.00 mm
F-Number $F_{no}$ = 2.9
Image Height 2Y = 1.218 mm

First Embodiment

In the lens system of the first embodiment, the first lens $L_1$ and the third lens $L_3$ of the first junction type compound lens are formed of transparent curable silicone resin SMX-7852 (made by Fuji Polymer Industries Co., Ltd.) containing transparent adhesive, and the second lens $L_2$ is formed of optical glass BK 7 (made by Ohara Inc.). The fourth lens $L_4$ and the sixth lens $L_6$ of the second junction type compound lens are formed of transparent curable silicone resin SMX-7852 (made by Fuji Polymer Industries Co. Ltd.) containing transparent adhesive, and the fifth lens $L_5$ is formed of optical glass BK 7 (made by Ohara Inc.).

(A) The refractive index $N_2$ of the first lens $L_1$ is $N_2$=1.51000.

(B) The refractive index $N_3$ of the second lens $L_2$ is $N_3$=1.51680.

(C) The refractive index $N_4$ of the third lens $L_3$ is $N_4$=1.51000.

(D) The Abbe number $v_2$ of the first lens $L_1$ is $v_2$=56.0.

(E) The Abbe number $v_3$ of the second lens $L_2$ is $v_3$=61.0.

(F) The Abbe number $v_4$ of the third lens $L_3$ is $v_4$=56.0.

(G) The refractive index $N_8$ of the fourth lens $L_4$ is $N_8$=1.51000.

(H) The refractive index Ng of the fifth lens $L_5$ is $N_9$=1.51680.

(I) The refractive index $N_{10}$ of the sixth lens $L_6$ is $N_{10}$=1.51000.

(J) The Abbe number $v_8$ of the fourth lens $L_4$ is $v_8$=56.0.

(K) The Abbe number $v_9$ of the fifth lens $L_5$ is $v_9$=61.0.

(L) The Abbe number $v_{10}$ of the sixth lens $L_6$ is $v_{10}$=56.0.

Therefore $|N_3-N_2|=|N_3-N_4|=|N_9-N_8|=|N_9-N_{10}|=0.00680$, which satisfies the following Conditions (1), (2), (5) and (6). Also $|v_3-v_2|=|v_3-v_4|=|v_9-v_8|=|v_9-v_{10}|=5.0$, which satisfies the following Conditions (3), (4), (7) and (8).

Conditions (1), (2), (5) and (6) refer to conditions given by the following Expressions (1), (2), (5) and (0.6). Also conditions (3), (4), (7) and (8) refer to the conditions given by the following Expressions (3), (4), (7) and (8).

$$0 \leq |N_3-N_2| \leq 0.1 \qquad (1)$$

$$0 \leq |N_3-N_4| \leq 0.1 \qquad (2)$$

$$0 \leq |v_3-v_2| \leq 30.0 \qquad (3)$$

$$0 \leq |v_3-v_4| \leq 30.0 \qquad (4)$$

$$0 \leq |N_9-N_8| \leq 0.1 \qquad (5)$$

$$0 \leq |N_9-N_{10}| \leq 0.1 \qquad (6)$$

$$0 \leq |v_9-v_8| \leq 30.0 \qquad (7)$$

$$0 \leq |v_9-v_{10}| \leq 30.0 \qquad (8)$$

Conditions (1) to (8) refer to conditions given by Expression (1) to (8) respectively, which is the same for the description herein below (description on the second embodiment to the fifth embodiment).

Figure 2:
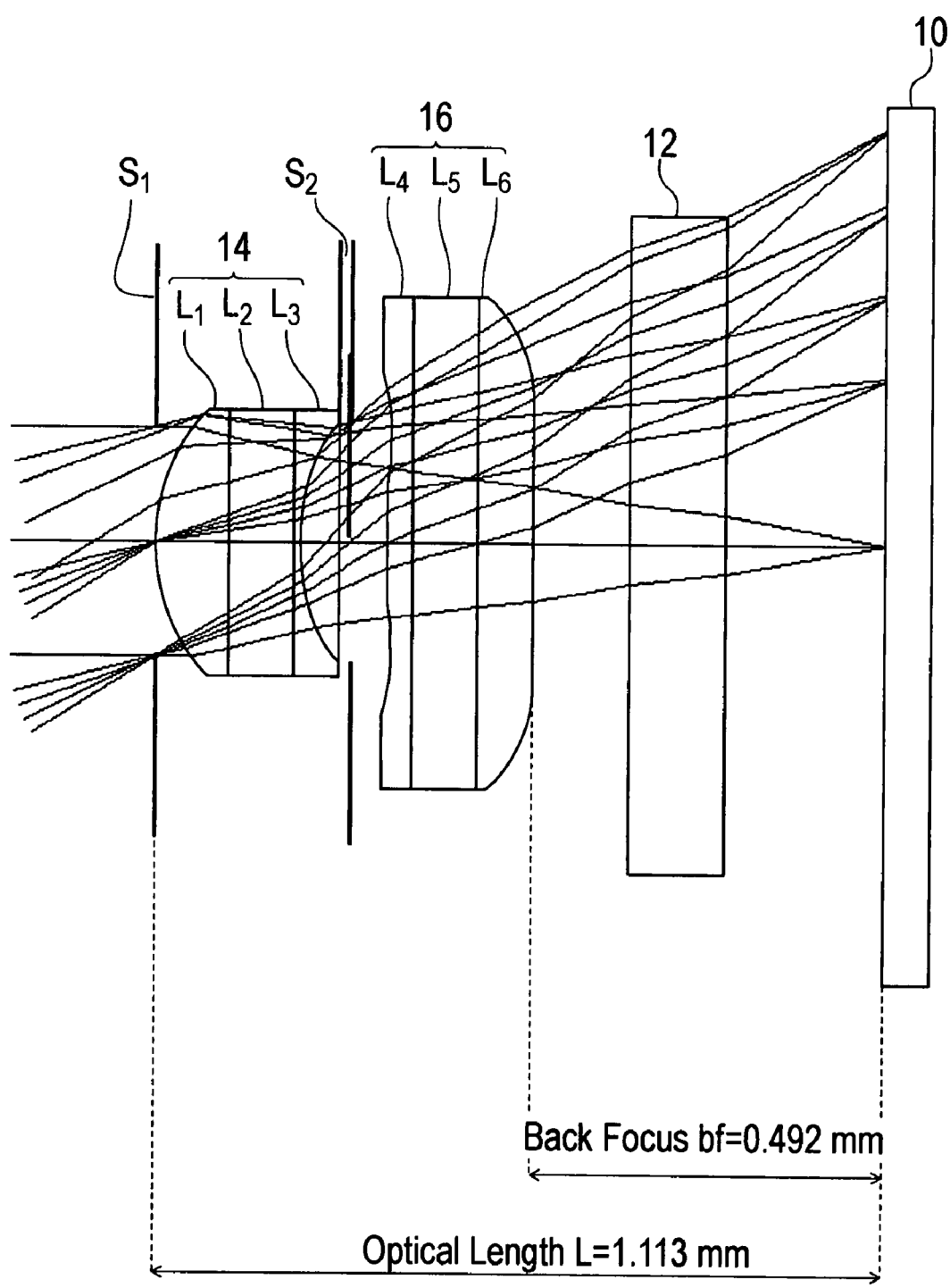
FIG. 2 is a cross-sectional view depicting an imaging lens according to a first embodiment.

FIG. 2 shows a cross-sectional view of the imaging lens of the first embodiment. As FIG. 2 shows, the first diaphragm $S_1$, which plays a role of an aperture stop, is disposed at an intersection of the first surface (surface at object side) of the first lens $L_1$ constituting the first junction type compound lens 14 and the optical axis. The second diaphragm $S_2$, which plays a role of preventing a flare and smear, is disposed between the first junction type compound lens 14 and the second junction type compound lens 16.

The diaphragm surface of the first diaphragm $S_1$ is a plane, so $r_1=\infty$ is indicated in Table 1. The second diaphragm $S_2$ is comprised of planes $r_6$ and $r_7$, so $r_6=\infty$ and $r_7=\infty$ are indicated in Table 1. The F number Fno is 2.9.

As Table 1 shows, $r_3=\infty$ and $r_4=\infty$ so the second lens $L_2$ is a plane parallel glass plate, and since $r_9=\infty$ and $r_{10}=\infty$, the fifth lens $L_5$ is a plane parallel glass plate. Since $r_2$ is a positive value and $r_5$ is a positive value, the first lens $L_1$ is a plano-convex lens where the object side face of this first lens $L_1$ is a convex surface facing the object side, on a paraxial line, and the third lens $L_3$ is a plano-concave lens where the image side face of this third lens $L_3$ is a concave surface facing the image side on a paraxial line. Since $r_8$ is a positive value and $r_{11}$ is also a positive number, the fourth lens $L_4$ is a plano-convex lens where the object side face of this fourth lens $L_4$ is a convex surface facing the object side on a paraxial line, and the sixth lens $L_6$ is a plano-concave lens where the image side face of this sixth lens $L_6$ is a concave surface facing the image side on a paraxial line.

As FIG. 2 shows, the optical length L with respect to the focal distance f=1.00 mm is 1.113 mm, and the back focus bf is 0.492 nm.

Figure 3:
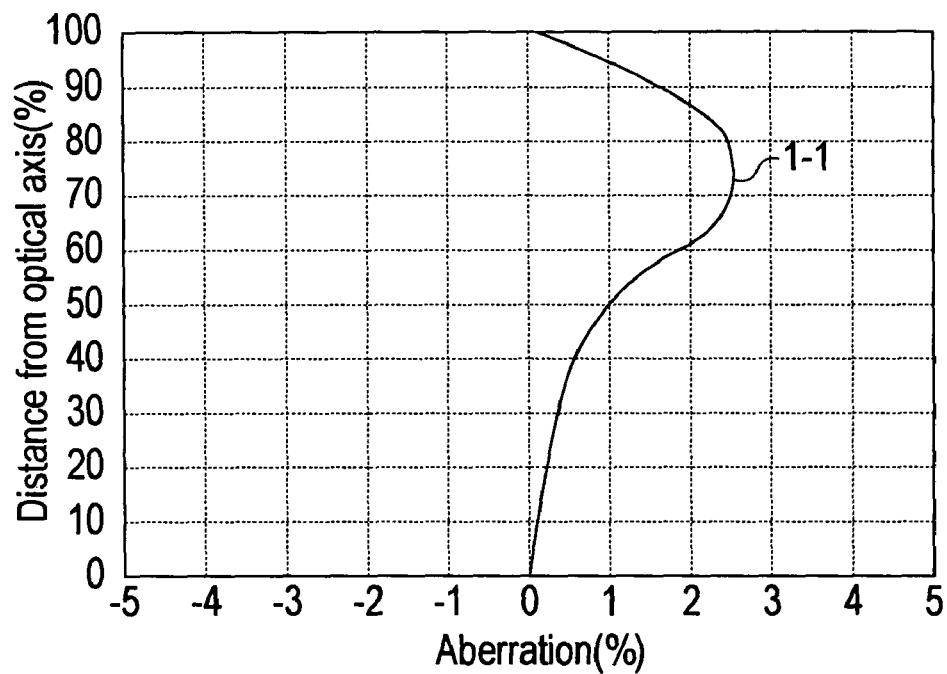
FIG. 3 is a diagram depicting the distortion aberration of the imaging lens of the first embodiment.
Figure 4:
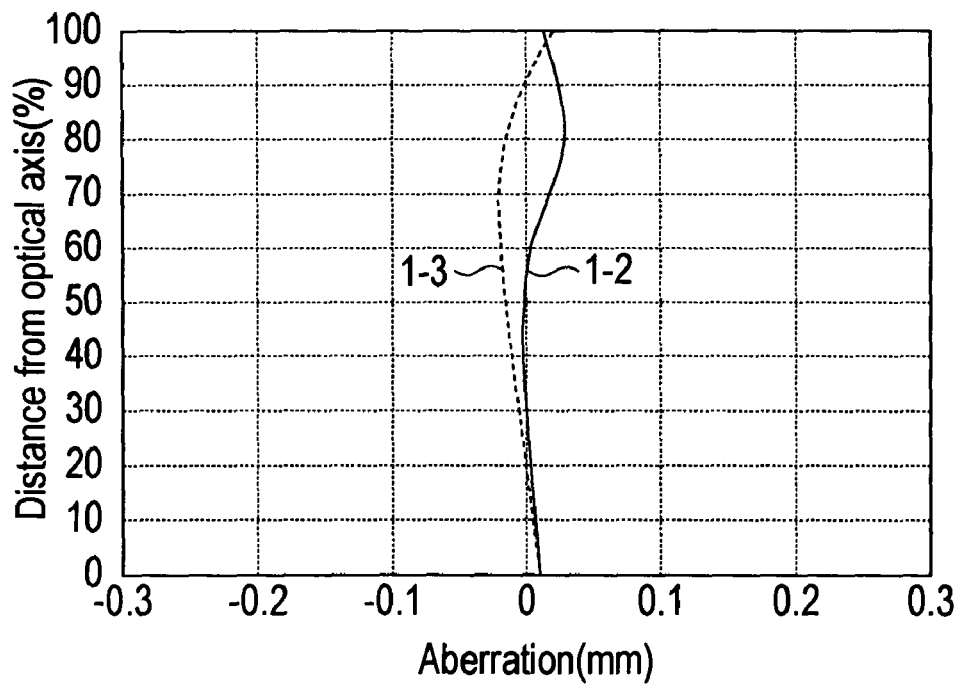
FIG. 4 is a diagram depicting the astigmatism aberration of the imaging lens of the first embodiment.
Figure 5:
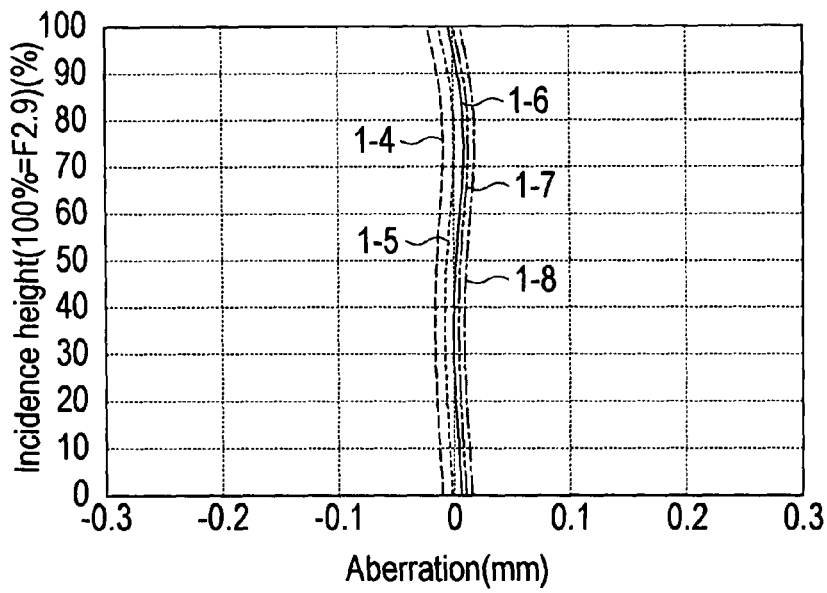
FIG. 5 is a diagram depicting the chromatic/spherical aberration of the imaging lens of the first embodiment.

FIG. 3 shows a graph of the distortion aberration curve 1-1, FIG. 4 shows a graph of the astigmatism aberration curve (aberration curve 1-2 on the meridional surface and aberration curve 1-3 on the sagittal surface), and FIG. 5 shows a graph of a chromatic/spherical aberration curve (aberration curve 1-4 on g-line, aberration curve 1-5 on F-line, aberration curve 1-6 on e-line, aberration curve 1-7 on d-line and aberration curve 1-8 on C-line).

The ordinates of the aberration curves in FIG. 3 and FIG. 4 show the image height by a % of the distance from the optical axis. In FIG. 3 and FIG. 4, 100% corresponds to 0.623 mm. The ordinate of the aberration curve in FIG. 5 shows the incident height h (F number), and the maximum thereof corresponds to 2.9. The abscissa of FIG. 3 shows the aberration (%), and the abscissas of FIG. 4 and FIG. 5 show the value of the aberration (mm).

For the distortion aberration, the absolute value of the aberration is 2.5%, which is the maximum, at the position of image height 75% (image height 0.467 mm), and the absolute value of the aberration is within 2.5% in a range where the image height is 0.623 mm or less.

For the astigmatism aberration, the absolute value of the aberration is 0.029 mm, which is the maximum, at the position of the image height 80% (image height 0.498 mm), and the absolute value of the aberration is within 0.029 mm in a range where the image height is 0.623 mm or less.

For the chromatic/spherical aberration, the absolute value of the aberration curve 1-4 on the g-line is 0.0225 mm, which is the maximum, at 100% of the incident height h, and the absolute value of the aberration is within 0.0225 mm.

Therefore according to the imaging lens of the first embodiment, the optical length is short enough to be installed in a portable telephone, and the back focus is long enough to insert such components as a filter and cover glass between the imaging lens and the image sensing plane, and good images are acquired.

Second Embodiment

In this lens system of the second embodiment, the first lens $L_1$ and the third lens $L_3$ of the first junction type compound lens are formed of transparent curable silicone resin SR-7010 (made by Dow Corning Toray Co., Ltd.) containing transparent adhesive, and the second lens $L_2$ is formed by optical glass BK 7 (made by Ohara Inc.). The fourth lens $L_4$ and the sixth lens $L_6$ of the second junction type compound lens are formed of transparent curable silicone resin SR-7010 (made by Dow Corning Toray Co., Ltd.) containing transparent adhesive, and the fifth lens $L_5$ is formed of optical glass BK 7 (made by Ohara Inc.).

(A) The refractive index $N_2$ of the first lens $L_1$ is $N_2=1.53000$.

(B) The refractive index $N_3$ of the second lens $L_2$ is $N_3=1.51680$.

(C) The refractive index $N_4$ of the third lens $L_3$ is $N_4=1.53000$.

(D) The Abbe number $\nu_2$ of the first lens $L_1$ is $\nu_2=35.0$.

(E) The Abbe number $\nu_3$ of the second lens $L_2$ is $\nu_3=61.0$.

(F) The Abbe number $\nu_4$ of the third lens $L_3$ is $\nu_4=35.0$.

(G) The refractive index $N_8$ of the fourth lens $L_4$ is $N_8=1.53000$.

(H) The refractive index $N_9$ of the fifth lens $L_5$ is $N_9=1.51680$.

(I) The refractive index $N_{10}$ of the sixth lens $L_6$ is $N_{10}=1.53000$.

(J) The Abbe number $\nu_8$ of the fourth lens $L_4$ is $\nu_8=35.0$.

(K) The Abbe number $\nu_9$ of the fifth lens $L_5$ is $\nu_9=61.0$.

(L) The Abbe number $\nu_{10}$ of the sixth lens $L_6$ is $\nu_{10}=35.0$.

Therefore $|N_3-N_2|=|N_3-N_4|=|N_9-N_8|=|N_9-N_{10}|=0.01320$, which satisfies the following Conditions (1), (2), (5) and (6). Also $|\nu_3-\nu_2|=|\nu_3-\nu_4|=|\nu_9-\nu_8|=|\nu_9-\nu_{10}|=26.0$, which satisfies the following Conditions (3), (4), (7) and (8).

Figure 6:
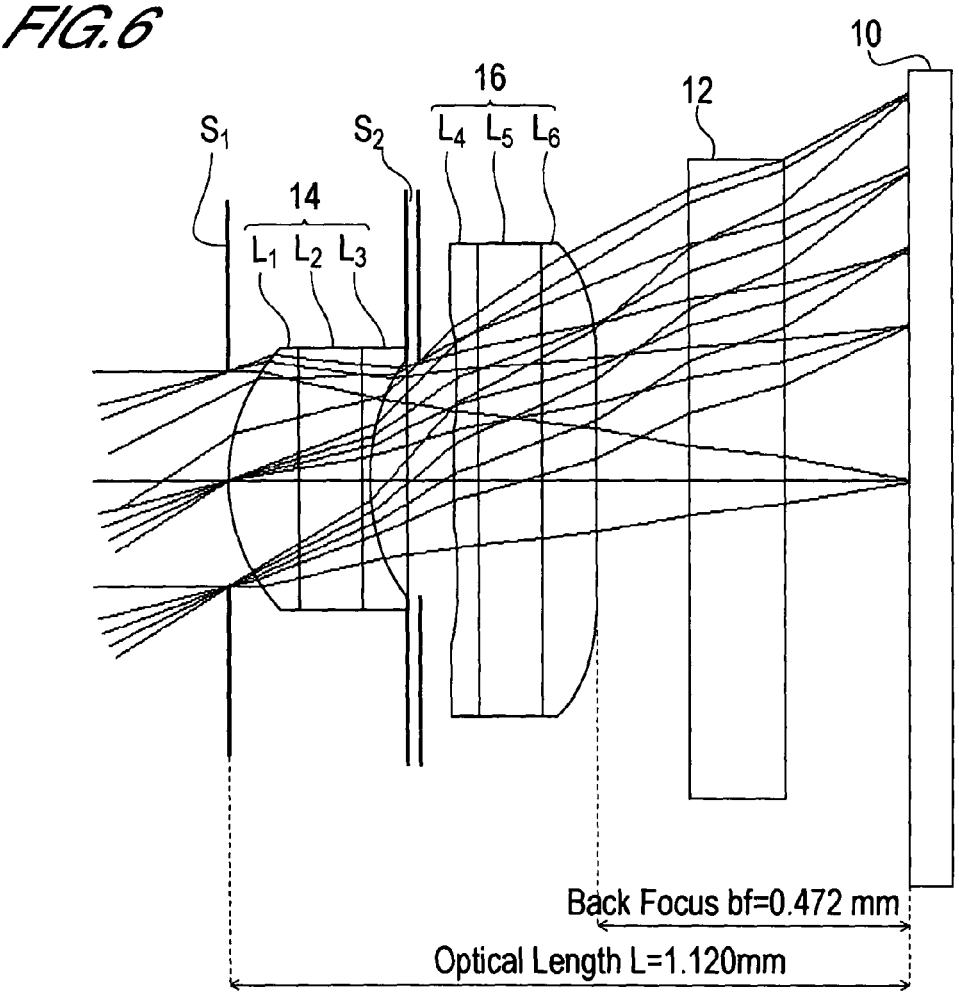
FIG. 6 is a cross-sectional view depicting an imaging lens according to a second embodiment.

FIG. 6 shows a cross-sectional view of the imaging lens of the second embodiment. As FIG. 6 shows, the first diaphragm $S_1$, which plays a role of an aperture stop, is disposed at an intersection of the first surface (surface at the object side) of the first lens $L_1$ constituting the first junction type compound lens 14 and the optical axis. The second diaphragm $S_2$, which plays a role of preventing a flare or smear, is disposed between the first junction type compound lens 14 and the second junction type compound lens 16.

The diaphragm surface of the first diaphragm $S_1$ is a plane, so $r_1=\infty$ is indicated in Table 2. The second diaphragm $S_2$ is comprised of the planes $r_6$ and $r_7$, so $r_6=\infty$ and $r_7=\infty$ are indicated in Table 2. The F number Fno is 2.9.

As Table 2 shows, $r_3=\infty$ and $r_4=\infty$ so the second lens $L_2$ is a plane parallel glass plate, and since $r_9=\infty$ and $r_{10}=\infty$, the fifth lens $L_5$ is a plane parallel glass plate. Since $r_2$ is a positive value and $r_5$ is a positive value, the first lens $L_1$ is a plano-convex lens where the object side face of this first lens $L_1$ is a convex surface facing the object side, on a paraxial line, and the third lens $L_3$ is a plano-concave lens where the image side face of this third lens $L_3$ is a concave surface facing the image side on a paraxial line. Since $r_8$ is a positive value and $r_{11}$ is also a positive value, the fourth lens $L_4$ is a plano-convex lens where the object side face of this fourth lens $L_4$ is a convex surface facing the object side on a paraxial line, and the sixth lens $L_6$ is a plano-concave lens where the image side face of this sixth lens $L_6$ is a concave surface facing the image side on a paraxial line.

As FIG. 6 shows, the optical length L with respect to the focal distance f=1.00 mm is 1.120 mm, and the back focus bf is 0.472 mm.

Figure 7:
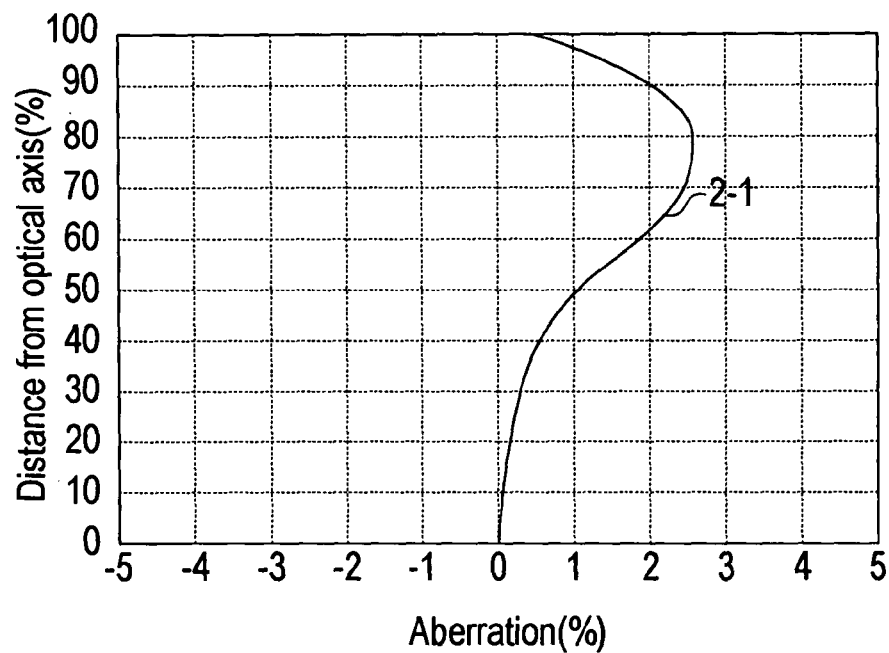
FIG. 7 is a diagram depicting the distortion aberration of the imaging lens of the second embodiment.
Figure 8:
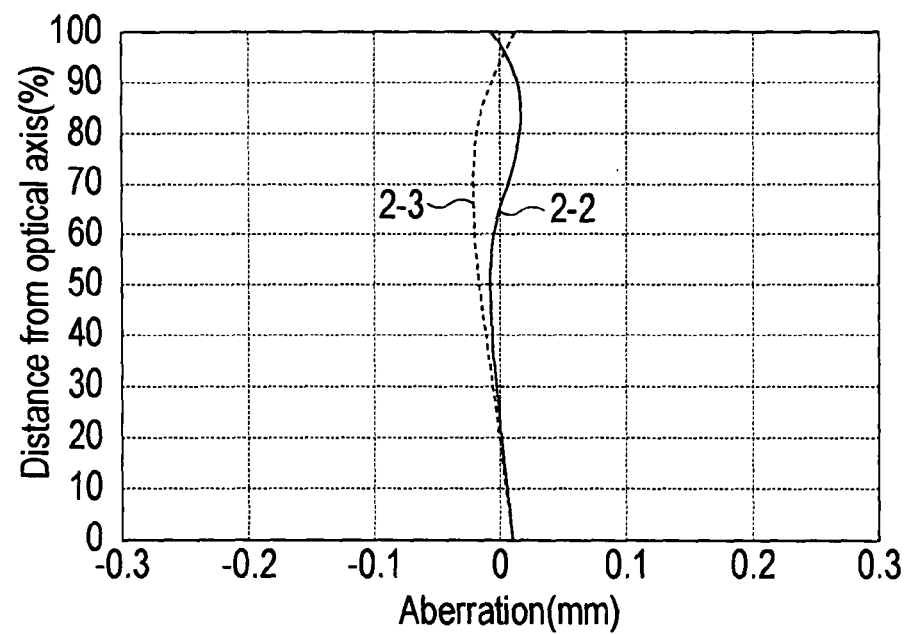
FIG. 8 is a diagram depicting the astigmatism aberration of the imaging lens of the second embodiment.
Figure 9:
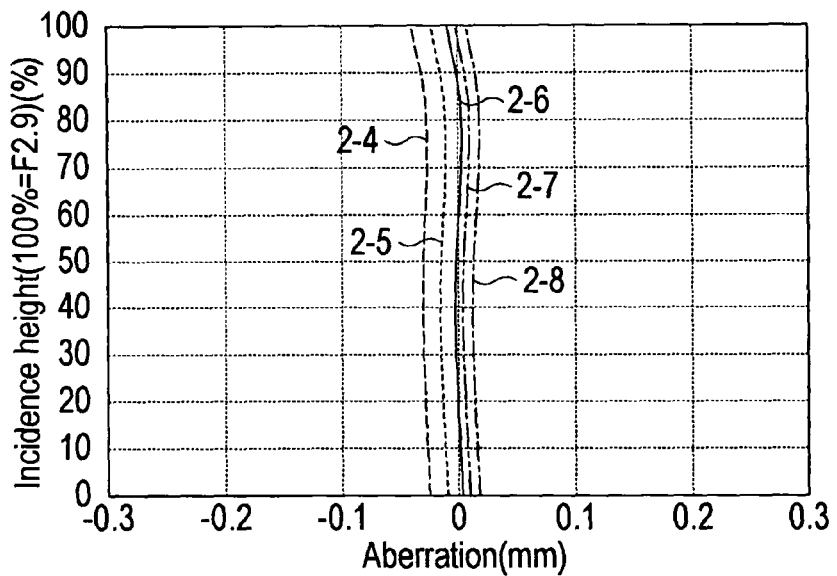
FIG. 9 is a diagram depicting the chromatic/spherical aberration of the second embodiment.

FIG. 7 shows a graph of the distortion aberration curve 2-1, FIG. 8 shows a graph of the astigmatism aberration curve (aberration curve 2-2 on the meridional surface and aberration curve 2-3 on the sagittal surface), FIG. 9 shows a graph of a chromatic/spherical aberration curve (aberration curve 2-4 on g-line, aberration curve 2-5 on F-line, aberration curve 2-6 on e-line, aberration curve 2-7 on d-line and aberration curve 2-8 on C-line).

The ordinates of the aberration curves in FIG. 7 and FIG. 8 show the image height by a % of the distance from the optical axis. In FIG. 7 and FIG. 8, 100% corresponds to 0.619 mm. The ordinate of the aberration curve in FIG. 9 shows the incident height h (F number), and the maximum thereof corresponds to 2.9. The abscissa of FIG. 7 shows the aberration (%), and the abscissas of FIG. 8 and FIG. 9 show the value of the aberration (mm).

For the distortion aberration, the absolute value of the aberration is 2.7%, which is the maximum, at the position of image height 75% (image height 0.464 mm), and the absolute value of the aberration is within 2.7% in a range where the image height is 0.619 mm or less.

For the astigmatism aberration, the absolute value of the aberration is 0.02 mm, which is the maximum, at the position of the image height 70% (image height 0.433 mm), and the absolute value of the aberration is within 0.02 mm in a range where the image height is 0.619 mm or less.

For the chromatic/spherical aberration, the absolute value of the aberration curve 2-4 on the g-line is 0.0398 mm, which is the maximum, at 100% of the incident height h, and the absolute value of the aberration is within 0.0398 mm.

Therefore according to the imaging lens of the second embodiment, the optical length is short enough to be installed in a portable telephone, and the back focus is long enough to insert such components as a filter and cover glass between the imaging lens and the image sensing plane, and good images are acquired.

Third Embodiment

In the lens system of the third embodiment, the first lens $L_1$ and the third lens $L_3$ of the first junction type compound lens are formed of transparent curable silicone resin SMX-7852 (made by Fuji Polymer Industries Co., Ltd.) containing transparent adhesive, and the second lens $L_2$ is formed of optical glass BK 7 (made by Ohara Inc.). The fourth lens $L_4$ and the sixth lens $L_6$ of the second junction type compound lens are formed of transparent curable silicone resin SMX-7852 (made by Fuji Polymer Industries Co., Ltd.) containing transparent adhesive, and the fifth lens $L_5$ is formed of optical glass BK 7 (made by Ohara Inc.).

(A) The refractive index $N_2$ of the first lens $L_1$ is $N_2$=1.51000.

(B) The refractive index $N_3$ of the second lens $L_2$ is $N_3$=1.51680.

(C) The refractive index $N_4$ of the third lens $L_3$ is $N_4$=1.51000.

(D) The Abbe number $v_2$ of the first lens $L_1$ is $v_2$=56.0.

(E) The Abbe number $v_3$ of the second lens $L_2$ is $v_3$=61.0.

(F) The Abbe number $v_4$ of the third lens $L_3$ is $v_4$=56.0.

(G) The refractive index $N_8$ of the fourth lens $L_4$ is $N_8$=1.51000.

(H) The refractive index $N_9$ of the fifth lens $L_5$ is $N_5$=1.51680.

(I) The refractive index $N_{10}$ of the sixth lens $L_6$ is $N_{10}$=1.51000.

(J) The Abbe number $v_8$ of the fourth lens $L_4$ is $v_8$=56.0.

(K) The Abbe number $v_9$ of the fifth lens $L_5$ is $v_9$=61.0.

(L) The Abbe number $v_{10}$ of the sixth lens $L_6$ is $v_{10}$=56.0.

Therefore $|N_3-N_2|=|N_3-N_4|=|N_9-N_8|=|N_9-N_{10}|=$ 0.00680, which satisfies the following Conditions (1), (2), (5) and (6). Also $|v_3-v_2|=|v_3-v_4|=|v_9-v_8|=|v_9-v_{10}|=5.0$, which satisfies the following Conditions (3), (4), (7) and (8).

Figure 10:
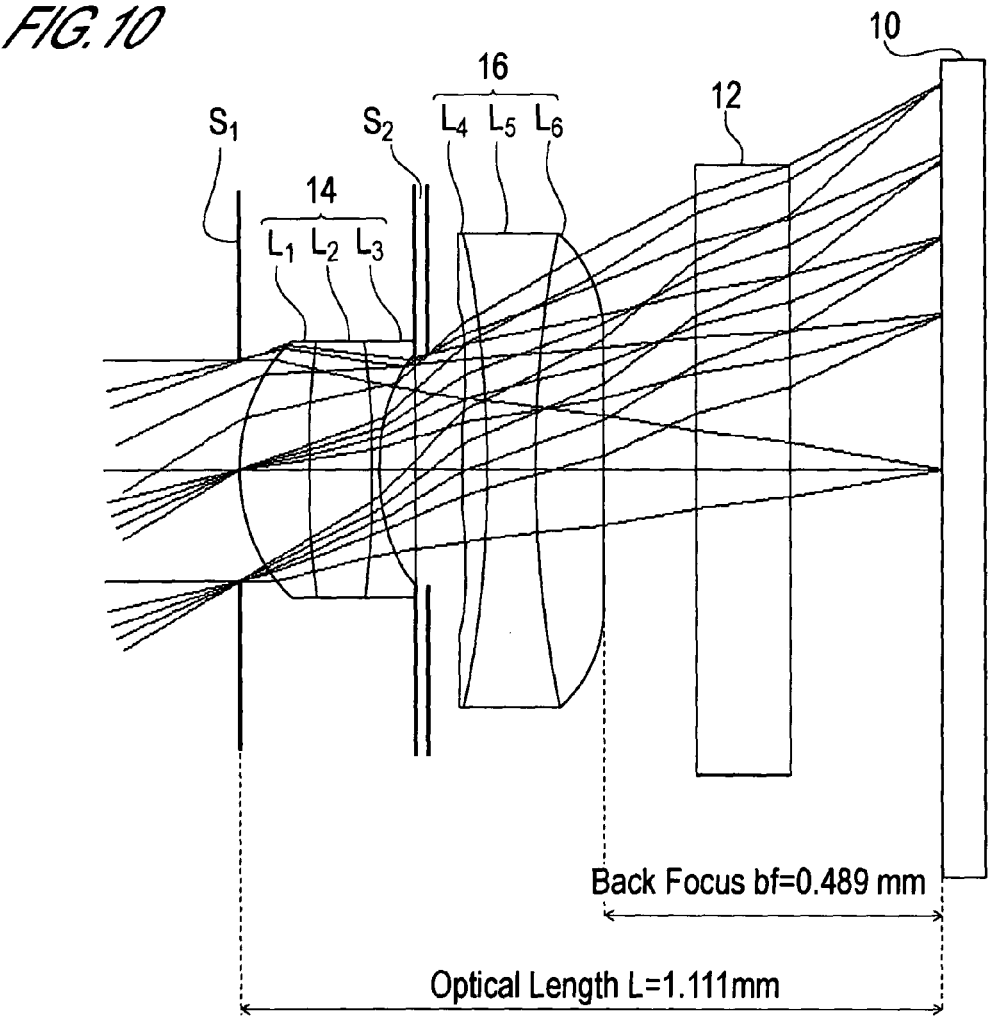
FIG. 10 is a cross-sectional view depicting an imaging lens according to a third embodiment.

FIG. 10 shows a cross-sectional view of the imaging lens of the third embodiment. As FIG. 10 shows, the first diaphragm $S_1$, which plays a role of an aperture stop, is disposed at an intersection of the first surface (surface at the object side) of the first lens $L_1$ constituting the first junction type compound lens 14 and the optical axis. The second diaphragm $S_2$, which plays a role of preventing a flare or smear, is disposed between the first junction type compound lens 14 and the second junction type compound lens 16.

The diaphragm surface of the first diaphragm $S_1$ is a plane, so $r_{10}=\infty$ is indicated in Table 3. The second diaphragm $S_2$ is comprised of the planes $r_6$ and $r_7$, so $r_6=\infty$ and $r_7=\infty$ are indicated in Table 3. The F number Fno is 2.9.

As Table 3 shows, the second lens $L_2$ is a bi-convex lens since $r_3$ is a positive value and $r_4$ is a negative value, and the fifth lens $L_5$ is a bi-concave lens since $r_9$ is a negative value and $r_{10}$ is a positive value. Since $r_2$ is a positive value and $r_5$ is also a positive value, the first lens $L_1$ is a lens where the object side face of this first lens $L_1$ is a convex surface facing the object side on a paraxial line, and the third lens $L_3$ is a lens where the image side face of this third lens $L_3$ is a concave surface facing the image side on a paraxial line. Since $r_8$ is a positive value and $r_{11}$ is also a positive value, the fourth lens $L_4$ is a lens where the object side face of this fourth lens $L_4$ is a convex surface facing the object side on a paraxial line, and the sixth lens $L_6$ is a lens where the image side face of this sixth lens $L_6$ is a concave surface facing the image side on a paraxial line.

As FIG. 10 shows, the optical length L with respect to the focal distance f=1.00 mm is 1.111 mm, and the back focus bf is 0.489 mm.

Figure 11:
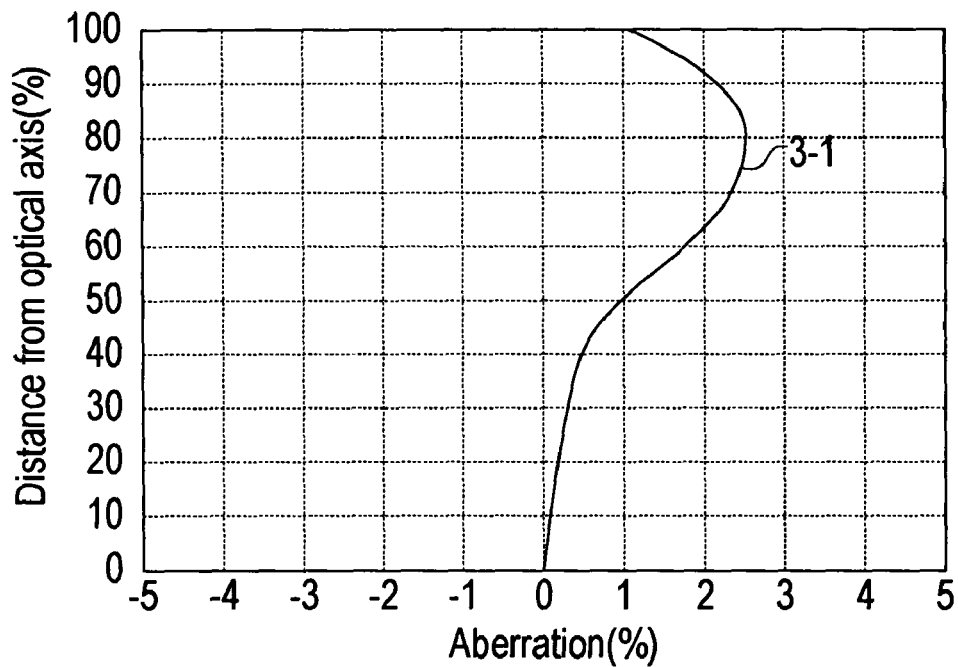
FIG. 11 is a diagram depicting the distortion aberration of the third embodiment.
Figure 12:
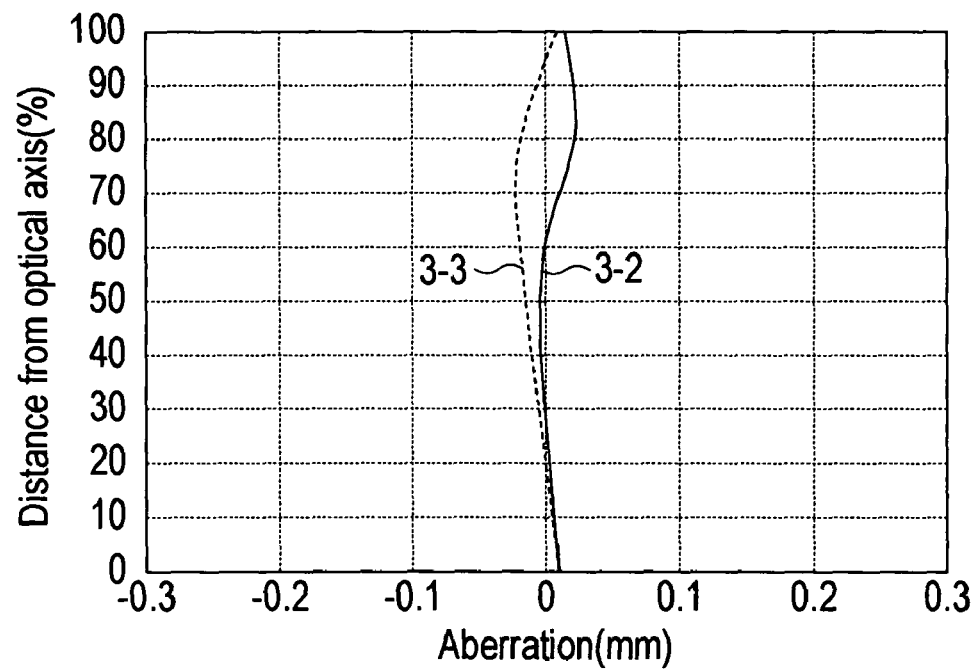
FIG. 12 is a diagram depicting the astigmatism aberration of the imaging lens of the third embodiment.
Figure 13:
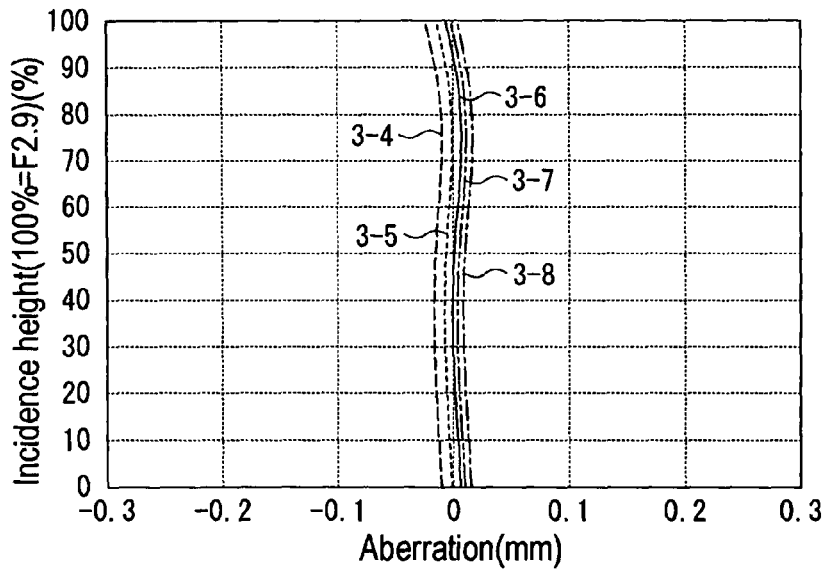
FIG. 13 is a diagram depicting the chromatic/spherical aberration of the imaging lens of the third embodiment.

FIG. 11 shows a graph of the distortion aberration curve 3-1, FIG. 12 shows a graph of the astigmatism aberration curve (aberration curve 3-2 on the meridional surface and aberration curve 3-3 on the sagittal surface), FIG. 13 shows a graph of a chromatic/spherical aberration curve (aberration curve 3-4 on g-line, aberration curve 3-5 on F-line, aberration curve 3-6 on e-line, aberration curve 3-7 on d-line and aberration curve 3-8 on C-line).

The ordinates of the aberration curves in FIG. 11 and FIG. 12 show the image height by a % of the distance from the optical axis. In FIG. 11 and FIG. 12, 100% corresponds to 0.600 mm. The ordinate of the aberration curve in FIG. 13 shows the incident height h (F number), and the maximum thereof corresponds to 2.9. The abscissa of FIG. 11 shows the aberration (%), and the abscissas of FIG. 12 and FIG. 13 show the value of the aberration (mm).

For the distortion aberration, the absolute value of the aberration is 2.5%, which is the maximum, at the position of image height 80% (image height 0.480 mm), and the absolute value of the aberration is within 2.5% in a range where the image height is 0.600 mm or less.

For the astigmatism aberration, the absolute value of the aberration is 0.0217 mm, which is the maximum, at the position of the image height 80% (image height 0.480 mm), and the absolute value of the aberration is within 0.0217 mm in a range where the image height is 0.600 mm or less.

For the chromatic/spherical aberration, the absolute value of the aberration curve 3-4 on the g-line is 0.0239 mm, which is the maximum, at 100% of the incident height h, and the absolute value of the aberration is within 0.0239 mm.

Therefore according to the imaging lens of the third embodiment, the optical length is short enough to be installed in a portable telephone, and the back focus is long enough to insert such components as a filter and cover glass between the imaging lens and the image sensing plane, and good images are acquired.

Fourth Embodiment

In the lens system of the fourth embodiment, the first lens $L_1$ and the third lens $L_3$ of the first junction type compound lens are formed of transparent curable silicone resin SMX-7852 (made by Fuji Polymer Industries Co., Ltd.) containing transparent adhesive, and the second lens $L_2$ is formed of optical glass BK 7 (made by Ohara Inc.). The fourth lens $L_4$ and the sixth lens $L_6$ of the second junction type compound lens are formed of transparent curable silicone resin SMX-7852 (made by Fuji Polymer Industries Co., Ltd.) containing transparent adhesive, and the fifth lens $L_5$ is formed of optical glass BK 7 (made by Ohara Inc.).

(A) The refractive index $N_2$ of the first lens $L_1$ is $N_2=1.51000$.

(B) The refractive index $N_3$ of the second lens $L_2$ is $N_3=1.51680$.

(C) The refractive index $N_4$ of the third lens $L_3$ is $N_4=1.51000$.

(D) The Abbe number $v_2$ of the first lens $L_1$ is $v_2=56.0$.

(E) The Abbe number $v_3$ of the second lens $L_2$ is $v_3=61.0$.

(F) The Abbe number $v_4$ of the third lens $L_3$ is $v_4=56.0$.

(G) The refractive index $N_8$ of the fourth lens $L_4$ is $N_8=1.51000$.

(H) The refractive index $N_9$ of the fifth lens $L_5$ is $N_9=1.51680$.

(I) The refractive index $N_{10}$ of the sixth lens $L_6$ is $N_{10}=1.51000$.

(J) The Abbe number $v_8$ of the fourth lens $L_4$ is $v_8=56.0$.

(K) The Abbe number $v_9$ of the fifth lens $L_5$ is $v_9=61.0$.

(L) The Abbe number $v_{10}$ of the sixth lens $L_6$ is $v_{10}=56.0$.

Therefore $|N_3-N_2|=|N_3-N_4|=|N_9-N_8|=|N_9-N_{10}|=0.00680$, which satisfies the following Conditions (1), (2), (5) and (6). Also $|v_3-v_2|=|v_3-v_4|=|v_9-v_8|=|v_9-v_{10}|=5.0$, which satisfies the following Conditions (3), (4), (7) and (8).

Figure 14:
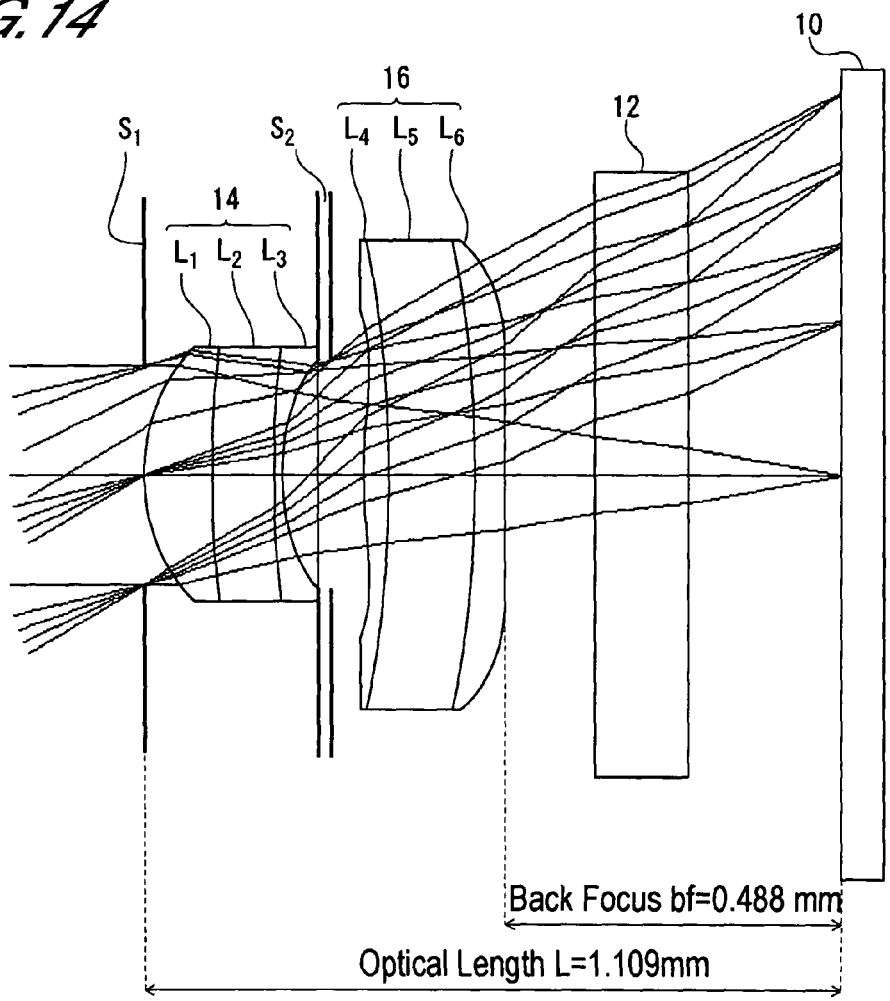
FIG. 14 is a cross-sectional view depicting an imaging lens according to a fourth embodiment.

FIG. 14 shows a cross-sectional view of the imaging lens of the fourth embodiment. As FIG. 14 shows, the first diaphragm $S_1$, which plays a role of an aperture stop, is disposed at an intersection of the first surface (surface at the object side) of the first lens $L_1$ constituting the first junction type compound lens 14 and the optical axis. The second diaphragm $S_2$, which plays a role of preventing a flare or smear, is disposed between the first junction type compound lens 14 and the second junction type compound lens 16.

The diaphragm surface of the first diaphragm $S_1$ is a plane, so $r_1=\infty$ is indicated in Table 4. The second diaphragm $S_2$ is comprised of the planes $r_6$ and $r_7$, so $r_6=\infty$ and $r_7=\infty$ are indicated in Table 4. The F number Fno is 2.9.

As Table 4 shows, the second lens $L_2$ is a meniscus lens of which convex surface is facing the object side since $r_3$ is a positive value and $r_4$ is also a positive value, and the fifth lens $L_5$ is a meniscus lens of which convex surface is facing the image side since $r_9$ is a negative value and $r_{10}$ is also a negative value. Since $r_2$ is a positive value and $r_5$ is also a positive value, the first lens $L_1$ is a lens where the object side face of this first lens $L_1$ is a convex surface facing the object side on a paraxial line, and the third lens $L_3$ is a lens where the image side face of this third lens $L_3$ is a concave surface facing the image side on a paraxial line. Since $r_8$ is a positive value and $r_{11}$ is also a positive value, the fourth lens $L_4$ is a lens where the object side face of this fourth lens $L_4$ is a convex surface facing the object side on a paraxial line, and the sixth lens $L_6$ is a lens where the image side face of this sixth lens $L_6$ is a concave surface facing the image side on a paraxial line.

As FIG. 14 shows, the optical length L with respect to the focal distance $f=1.00$ mm is 1.109 mm, and the back focus bf is 0.488 mm.

Figure 15:
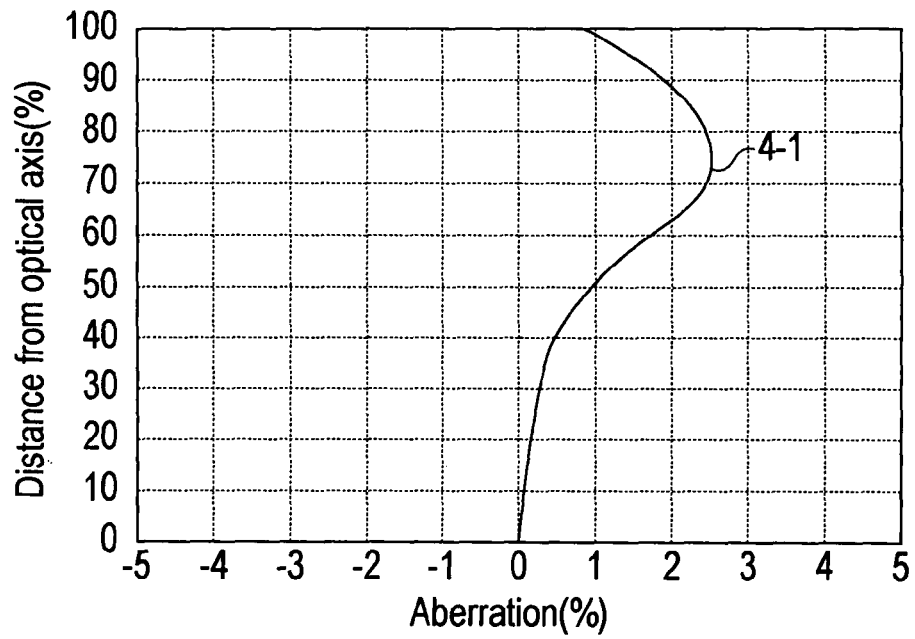
FIG. 15 is a diagram depicting the distortion aberration of the imaging lens of the fourth embodiment.
Figure 16:
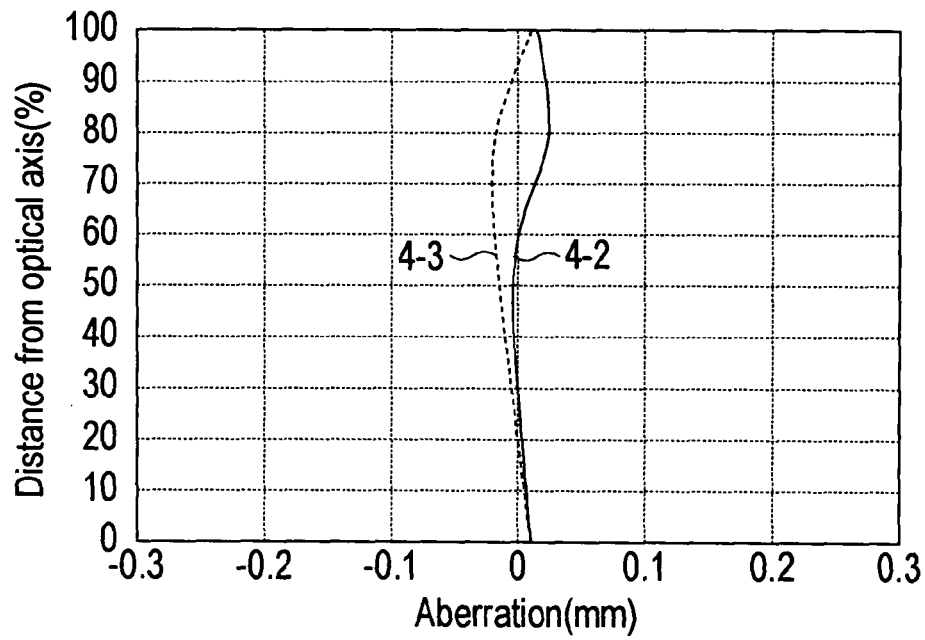
FIG. 16 is a diagram depicting the astigmatism aberration of the imaging lens of the fourth embodiment.
Figure 17:
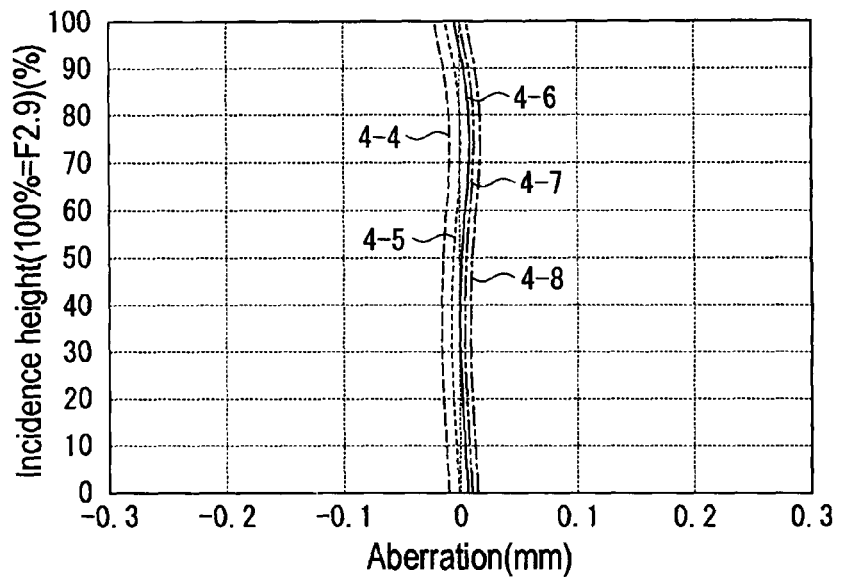
FIG. 17 is a diagram depicting the chromatic/spherical aberration of the imaging lens of the fourth embodiment.

FIG. 15 shows a graph of the distortion aberration curve 4-1, FIG. 16 shows a graph of the astigmatism aberration curve (aberration curve 4-2 on the meridional surface and aberration curve 4-3 on the sagittal surface), FIG. 17 shows a graph of a chromatic/spherical aberration curve (aberration curve 4-4 on g-line, aberration curve 4-5 on F-line, aberration curve 4-6 on e-line, aberration curve 4-7 on d-line and aberration curve 4-8 on C-line).

The ordinates of the aberration curves in FIG. 15 and FIG. 16 show the image height by a % of the distance from the optical axis. In FIG. 15 and FIG. 16, 100% corresponds to 0.600 mm. The ordinate of the aberration curve in FIG. 17 shows the incident height h (F number), and the maximum thereof corresponds to 2.9. The abscissa of FIG. 15 shows the aberration (%), and the abscissas of FIG. 16 and FIG. 17 show the value of the aberration (mm).

For the distortion aberration, the absolute value of the aberration is 2.5%, which is the maximum, at the position of image height 75% (image height 0.450 mm), and the absolute value of the aberration is within 2.5% in a range where the image height is 0.600 mm or less.

For the astigmatism aberration, the absolute value of the aberration is 0.0242 mm, which is the maximum, at the position of the image height 80% (image height 0.480 mm), and the absolute value of the aberration is within 0.0242 mm in a range where the image height is 0.600 mm or less.

For the chromatic/spherical aberration, the absolute value of the aberration curve 4-4 on the g-line is 0.0219 mm, which is the maximum, at 100% of the incident height h, and the absolute value of the aberration is within 0.0219 mm.

Therefore according to the imaging lens of the fourth embodiment, the optical length is short enough to be installed in a portable telephone, and the back focus is long enough to insert such components as a filter and cover glass between the imaging lens and the image sensing plane, and good images are acquired.

Fifth Embodiment

In the lens system of the fifth embodiment, the first lens $L_1$ and the third lens $L_3$ of the first junction type compound lens are formed of transparent curable silicone resin SMX-7852 (made by Fuji Polymer Industries Co., Ltd.) containing transparent adhesive, and the second lens $L_2$ is formed of optical glass BK 7 (made by Ohara Inc.). The fourth lens $L_4$ and the sixth lens $L_6$ of the second junction type compound lens are formed of transparent curable silicone resin SMX-7852 (made by Fuji Polymer Industries Co., Ltd.) containing transparent adhesive, and the fifth lens $L_5$ is formed of optical glass BK 7 (made by Ohara Inc.).

(A) The refractive index $N_2$ of the first lens $L_1$ is $N_2=1.51000$.

(B) The refractive index $N_3$ of the second lens $L_2$ is $N_3=1.51680$.

(C) The refractive index $N_4$ of the third lens $L_3$ is $N_4=1.51000$.

(D) The Abbe number $v_2$ of the first lens $L_1$ is $v_2=56.0$.

(E) The Abbe number $v_3$ of the second lens $L_2$ is $v_3=61.0$.

(F) The Abbe number $v_4$ of the third lens $L_3$ is $v_4=56.0$.

(G) The refractive index $N_8$ of the fourth lens $L_4$ is $N_8=1.51000$.

(H) The refractive index $N_9$ of the fifth lens $L_5$ is $N_9=1.51680$.

(I) The refractive index $N_{10}$ of the sixth lens $L_6$ is $N_{10}=1.51000$.

(J) The Abbe number $v_8$ of the fourth lens $L_4$ is $v_8=56.0$.

(K) The Abbe number $v_9$ of the fifth lens $L_5$ is $v_9=61.0$.

(L) The Abbe number $v_{10}$ of the sixth lens $L_6$ is $v_{10}=56.0$.

Therefore $|N_3-N_2|=|N_3-N_4|=|N_9-N_8|=|N_9-N_{10}|=0.00680$, which satisfies the following Conditions (1), (2), (5) and (6). Also $|v_3-v_2|=|v_3-v_4|=|v_9-v_8|=|v_9-v_{10}|=5.0$, which satisfies the following Conditions (3), (4), (7) and (8).

Figure 18:
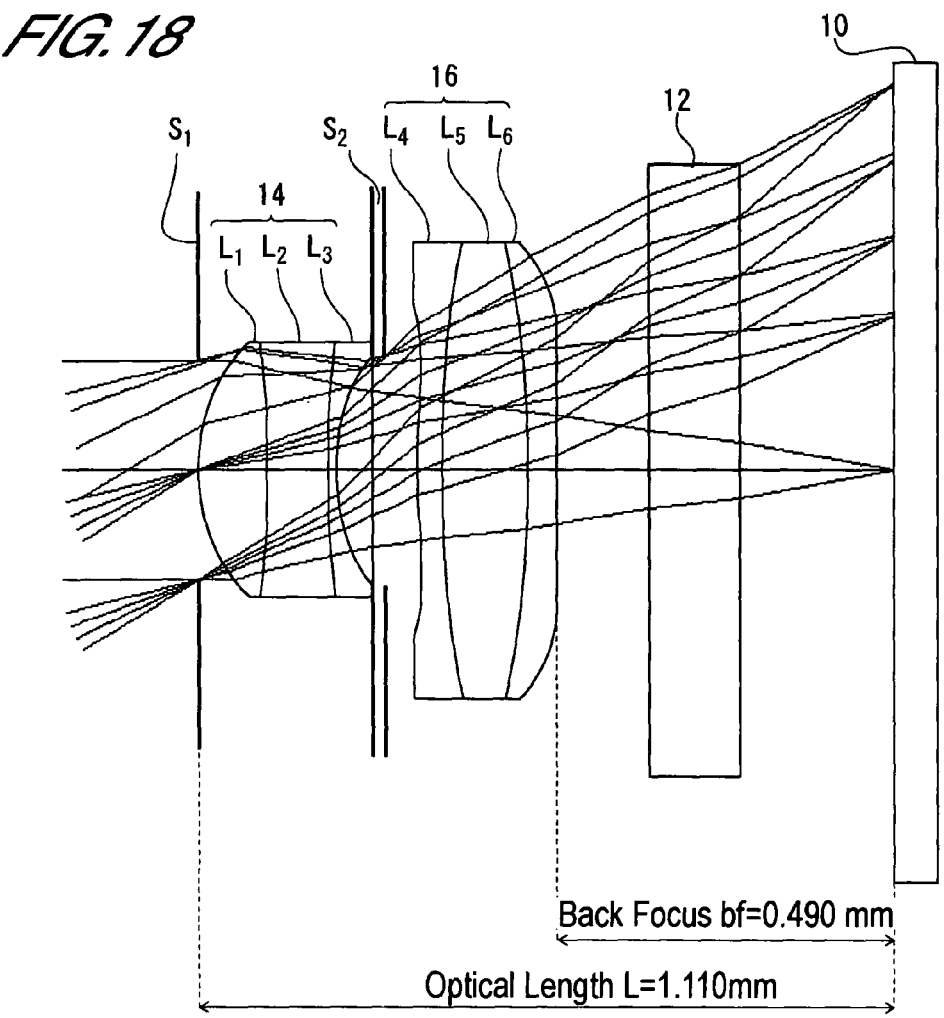
FIG. 18 is a cross-sectional view depicting an imaging lens according to a fifth embodiment.

FIG. 18 shows a cross-sectional view of the imaging lens of the fifth embodiment. As FIG. 18 shows, the first diaphragm $S_1$, which plays a role of an aperture stop, is disposed at an intersection of the first surface (surface at the object side) of the first lens $L_1$ constituting the first junction type compound lens 14 and the optical axis. The second diaphragm $S_2$, which plays a role of preventing a flare or smear, is disposed between the first junction type compound lens 14 and the second junction type compound lens 16.

The diaphragm surface of the first diaphragm $S_1$ is a plane, so $r_1=\infty$ is indicated in Table 5. The second diaphragm $S_2$ is comprised of the planes $r_6$ and $r_7$, so $r_6=\infty$ and $r_7=\infty$ are indicated in Table 5. The F number Fno is 2.9.

As Table 5 shows, the second lens $L_2$ is a b-concave lens since $r_3$ is a negative value and $r_4$ is a positive value, and the fifth lens $L_5$ is a bi-concave lens since $r_9$ is a positive value and $r_{10}$ is a negative value. Since $r_2$ is a positive value and $r_5$ is also a positive value, the first lens $L_1$ is a lens where the object side face of this first lens $L_1$ is a convex surface facing the object side on a paraxial line, and the third lens $L_3$ is a lens where the image side face of this third lens $L_3$ is a concave surface facing the image side on a paraxial line. Since $r_8$ is a positive value and $r_{11}$ is also a positive value, the fourth lens $L_4$ is a lens where the object side face of this fourth lens $L_4$ is a convex surface facing the object side on a paraxial line, and the sixth lens $L_6$ is a lens where the image side face of this sixth lens $L_6$ is a concave surface facing the image side on a paraxial line.

As FIG. 18 shows, the optical length L with respect to the focal distance f=1.00 mm is 1.110 mm, and the back focus bf is 0.490 mm.

Figure 19:
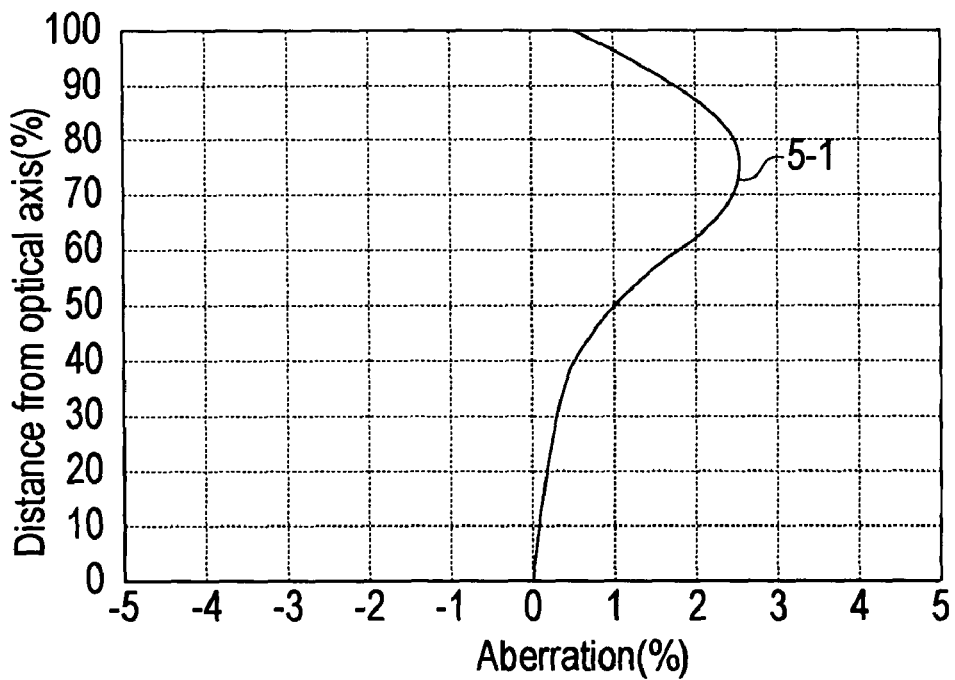
FIG. 19 is a diagram depicting the distortion aberration of the imaging lens of the fifth embodiment.
Figure 20:
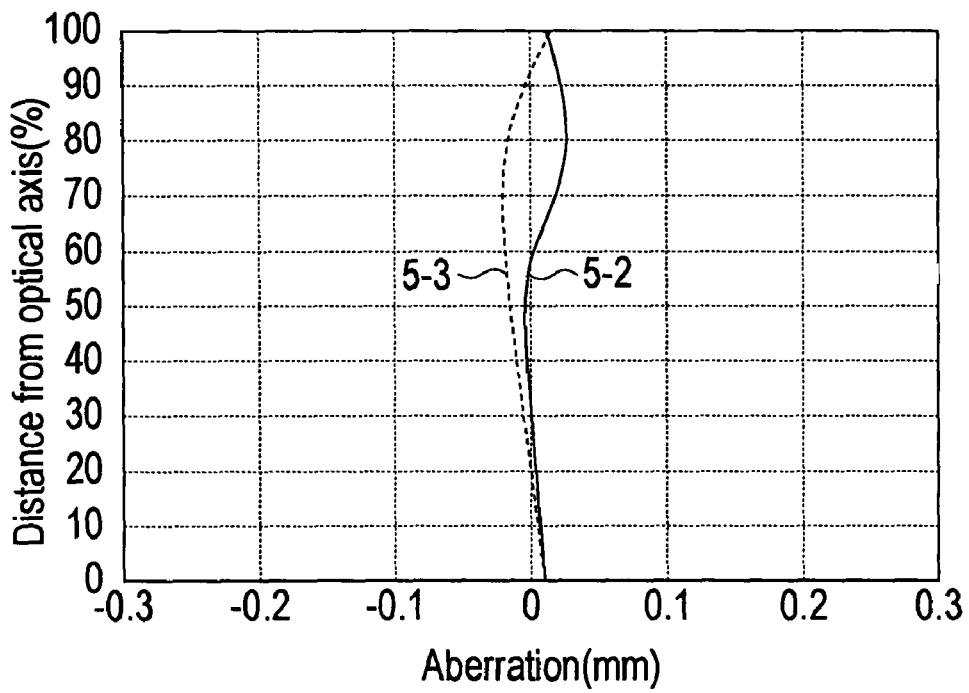
FIG. 20 is a diagram depicting the astigmatism aberration of the imaging lens of the fifth embodiment.
Figure 21:
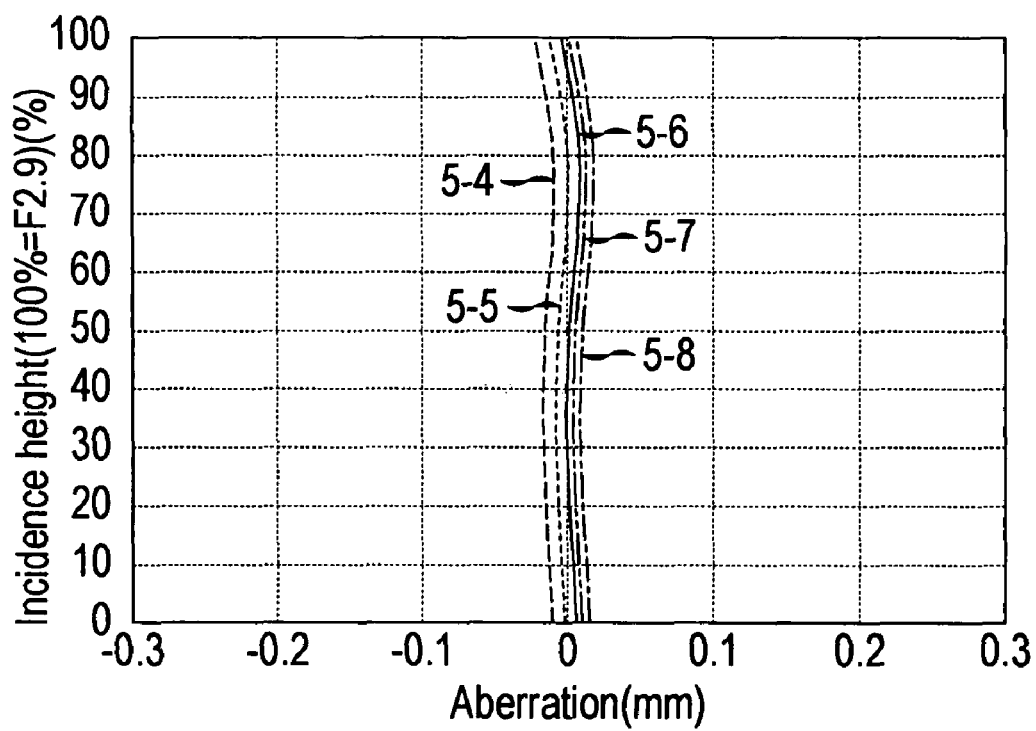
FIG. 21 is a diagram depicting the chromatic/spherical aberration of the imaging lens of the fifth embodiment.

FIG. 19 shows a graph of the distortion aberration curve 5-1, FIG. 20 shows a graph of the astigmatism aberration curve (aberration curve 5-2 on the meridional surface and aberration curve 5-3 on the sagittal surface), FIG. 21 shows a graph of a chromatic/spherical aberration curve (aberration curve 5-4 on g-line, aberration curve 5-5 on F-line, aberration curve 5-6 on e-line, aberration curve 5-7 on d-line and aberration curve 5-8 on C-line).

The ordinates of the aberration curves in FIG. 19 and FIG. 20 show the image height by a % of the distance from the optical axis. In FIG. 19 and FIG. 20, 100% corresponds to 0.609 mm. The ordinate of the aberration curve in FIG. 21 shows the incident height h (F number), and the maximum thereof corresponds to 2.9. The abscissa of FIG. 19 shows the aberration (%), and the abscissas of FIG. 20 and FIG. 21 show the value of the aberration (mm).

For the distortion aberration, the absolute value of the aberration is 2.5%, which is the maximum, at the position of image height 75% (image height 0.457 mm), and the absolute value of the aberration is within 2.5% in a range where the image height is 0.609 mm or less.

For the astigmatism aberration, the absolute value of the aberration on the meridional surface is 0.0267 mm, which is the maximum, at the position of the image height 80% (image height 0.488 mm), and the absolute value of the aberration is within 0.0267 mm in a range where the image height is 0.609 mm or less.

For the chromatic/spherical aberration, the absolute value of the aberration curve 5-4 on the g-line is 0.0224 mm, which is the maximum, at 100% of the incident height h, and the absolute value of the aberration is within 0.0224 mm.

Therefore according to the imaging lens of the fifth embodiment, the optical length is short enough to be installed in a portable telephone, and the back focus is long enough to insert such components as a filter and cover glass between the imaging lens and the image sensing plane, and good images are acquired.

As the description on the imaging lenses according to the first embodiment to the fifth embodiment show, the problems to be solved by this invention are solved by designing each composing lens of the imaging lens so as to satisfy the above Expressions (1) to (8). In other words, an imaging lens where various aberrations are well corrected, sufficient back focus is acquired, and the optical length is kept short can be acquired.

As described above, the imaging lens of the present invention is suitable not only for a lens for a camera built into a portable telephone, personal computer or digital camera, but also for a lens for a camera built into a personal digital assistant (PDA), a lens for a camera built into a toy having an image recognition function, and a lens for a camera built into monitoring, inspection or crime prevention equipment.

<Manufacturing Method for Junction Type Compound Lens>

The manufacturing steps of a junction type compound lens will now be described with reference to FIG. 22(A) to (G). Here a first junction type compound lens will be described as an example, but the manufacturing steps are the same for a second junction type compound lens. In the case of a second junction type compound lens, replace the first lens $L_1$, second lens $L_2$ and third lens $L_3$ with the fourth lens $L_4$, fifth lens $L_5$ and sixth lens $L_6$ respectively in the following description. In the following description of the manufacturing method for a junction type compound lens, a first junction type compound lens will simply be called a "junction type compound lens".

Figure 22A:
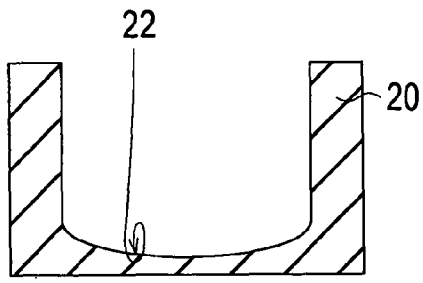
FIG. 22 are diagrams depicting the manufacturing steps of a junction type compound lens.
Figure 22B:
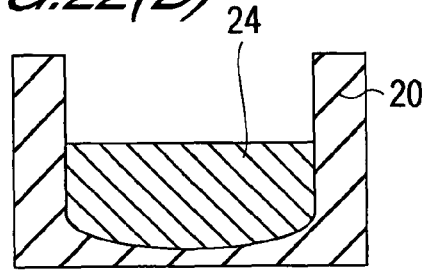
Figure 22C:
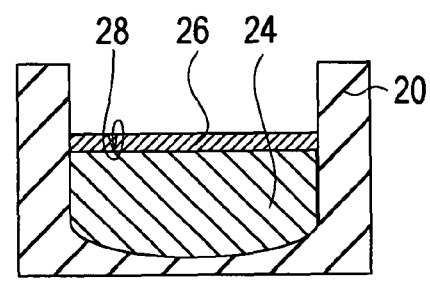
Figure 22D:
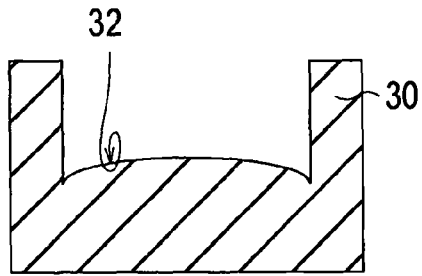
Figure 22E:
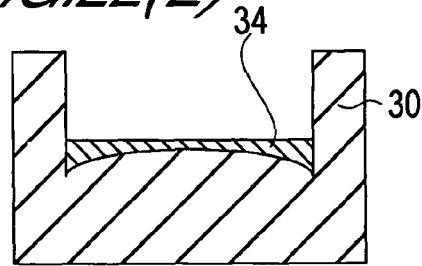
Figure 22F:
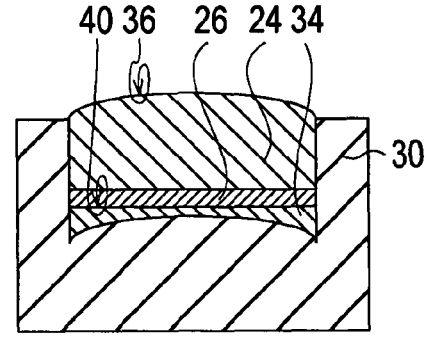
Figure 22G:
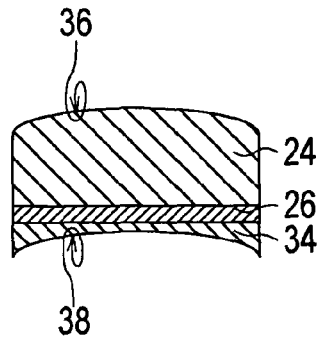

FIG. 22(A) to (G) are diagrams depicting the manufacturing steps of a junction type compound lens. FIG. 22(A) to (F) show cross-sections when a cylindrical die used for forming the following first lens and third lens is sectioned in a direction along a center line of the cylinder, including this center line. FIGS. 22(B), (C), (E) and (F) include a silicone resin and optical glass, which are composing materials of the junction type compound lens. FIG. 22(G) shows a cross-section of a junction type compound lens formed by the manufacturing steps of the junction type compound lens described with reference to FIG. 22(A) to (F) sectioned along the optical axis of the junction type compound lens, including this optical axis.

FIG. 22(A) is a cross-sectional view of a die 20 for forming the second lens $L_2$ joining with the first lens $L_1$. The die 20 is a cylinder where the side wall of the inner face is cylindrical, and the bottom face 22 is a curved surface which is convex downward for forming an object side face $r_2$ of the first lens $L_1$. In other words, the shape of the bottom face 22 is a shape the same as the curved surface of the object side face $r_2$ of the first lens $L_1$.

FIG. 22(B) shows a state where transparent curable silicone resin 24, which is in a liquid state before curing, is injected into the die 20. In the manufacturing steps of the junction type compound lens to be described below, a case of using a thermo-setting resin will be described as an example, but a UV curable resin can also be used.

Generally a thermo-setting resin is a resin which is cured by high temperature during molding. The thermo-setting resin is cured by progressing a cross-linking reaction, where the side chains protruding from a chain type long polymer are bonded with the side chains of another polymer, by high temperature, and the polymers are three-dimensionally bonded and immobilized. Since the cross-linking reaction is an irreversible reaction, the thermo-setting resin once cured does not become soft, even if heated again.

It is preferable that a filler and adhesive are mixed in the thermo-setting resin used for this invention. This is to maintain the bonding strength between the first lens $L_1$ and the second lens $L_2$, and the bonding strength between the second lens $L_2$ and the third lens $L_3$ to a strength whereby the lenses do not separate during the manufacturing steps and during use as an imaging lens.

The UV curable resin is normally a resin comprised of monomers and oligomers (major component of resin, an intermediate material between polymer and monomer), an optical initiator and additive agent. If ultraviolet is irradiated onto this mixture, the optical initiator is converted from a monomer (diluent of resin, constituting a part of cured resin) in a liquid status into a polymer in a solid status by a photo-polymerization reaction. For a UV curable resin as well, it is preferable that a filler and adhesive are mixed in, just like the case of the thermo-setting resin.

FIG. 22(C) shows a state when one surface of an optical glass 26 to be the second lens $L_2$ and a surface 28 of the transparent curable silicone resin 24 in a liquid state before curing are contacted. In this status, the temperature of the die 20 is increased to the curing temperature of the transparent curable silicone resin 24, so as to cure the transparent curable silicone resin 24. After the transparent curable silicone resin 24 is cured by heat, the die 20 is cooled down, and the compound lens in a status of the cured transparent curable silicone resin 24 being bonded with the optical glass 26 is removed. The compound lens in this status is a doubled lens where the first lens $L_1$ and the second lens $L_2$ are directly bonded.

In the above mentioned imaging lenses of the first embodiment to the fifth embodiment, the inventor of the present invention confirmed that the first lens $L_1$ and the second lens $L_2$ can be formed such that the bonding strength thereof can be maintained to a strength whereby separation does not occur during the manufacturing steps and during use as an imaging lens.

FIG. 22(D) is a cross-sectional view of a die 30 for further bonding the third lens $L_3$ to the above mentioned compound lens, where the first lens $L_1$ and the second lens $L_2$ are directly bonded. Just like the die 20, the die 30 is a cylinder where the side wall of the inner face is cylindrical, and the bottom face 32 is a curved surface which is convex upward for forming an image face $r_5$ of the third lens $L_3$. In other words, the shape of the bottom face 32 is a shape the same as the curved surface of the image side face $r_5$ of the third lens $L_3$.

FIG. 22(E) shows a state where transparent curable silicone resin 34, which is in a liquid state before curing, is injected into the die 30. For the transparent curable silicone resin 34, a resin similar to the transparent curable silicone resin 24 or a different resin may be used. In any case, it is preferable to use a silicone resin selected as appropriate for the design of the junction type compound lens of the present invention.

FIG. 22(F) shows a state where a surface of the second lens $L_2$, the opposite side of the side where the first lens $L_1$, of the compound lens where the first lens $L_1$ and the second lens $L_2$ are bonded, and a surface 40 of the liquid transparent curable silicone resin 34 in a pre-curing status, are contacted. The compound lens where the first lens $L_1$ and the second lens $L_2$ are bonded refers to a doubled junction type compound lens comprised of the transparent curable silicone resin 24 and the optical glass 26 (second lens $L_2$).

In the status shown in FIG. 22(F), the temperature of the die 30 is increased to the curing temperature of the transparent curable silicone resin 34, so as to cure the transparent curable silicone resin 34. At this time, the transparent curable silicone resin 24 has already been cured by heat, so the shape does not change even if the temperature of the transparent curable silicone resin 34 is increased to the curing temperature.

After the transparent curable silicone resin 34 is cured, the die 30 is cooled down, and the junction type compound lens (tripled junction type compound lens of the present invention), in a state where the cured transparent curable silicone resin 34 (formed as the third lens $L_3$) is bonded with the above mentioned doubled junction type compound lens where the first lens $L_1$ and the second lens $L_2$, are bonded.

In the above mentioned imaging lenses of the first embodiment to the fifth embodiment, the inventor of the present invention confirmed that the second lens $L_2$ and the third lens $L_3$ can be formed such that the bonding strength thereof can be maintained as a strength whereby separation does not occur during the manufacturing steps and during use as an imaging lens.

FIG. 22(G) is a cross-sectional view of the junction type composite lens completed via the above manufacturing steps sectioned in a direction along the optical axis. The transparent curable silicone resin 24 is the first lens $L_1$, the optical glass 26 is the second lens $L_2$, and the transparent curable silicone resin 34 is the third lens $L_3$. In the junction type compound lens shown in FIG. 22(G), the object side face 36 of the first lens has a convex surface facing the object side, and the image side face 38 of the third lens has a concave surface facing the image side.

The manufacturing steps of the junction type compound lens described with reference to FIG. 22(A) to (G) are manufacturing steps using dies, assuming the case of manufacturing a junction type compound lens, wherein the second lens $L_2$ is a plane parallel glass plate, the first lens $L_1$ is a plano-convex lens where the object side face 36 of this first lens $L_1$ is a convex surface facing the object side, and the third lens $L_3$ is a plano-concave lens where the image side face 38 of this third lens $L_3$ is a concave surface facing the image side. However, a junction type compound lens, of which directions of convex/concave of the lens surfaces are different, can also be manufactured by similar steps. The shape of the object side face 36 of the first lens $L_1$ is determined by the shape of the bottom face 22 of the die 20. The shape of the image side face 38 of the third lens $L_3$ is determined by the shape of the bottom face 32 of the die 30. In other words, the shape of the bottom faces of the die 20 and the die 30 are matched with the shape of the object side face 36 of the first lens $L_1$ and the shape of the image side face 38 of the third lens $L_3$ respectively.

In the manufacturing steps of the junction type compound lens described with reference to FIG. 22(A) to (G), the first lens and the third lens are formed by thermo-setting resin, so a temperature control device for increasing the temperature of the die 20 and the die 30, and controlling processing, is required. The configuration of the temperature control device is part of the design issues of the junction type compound lens manufacturing device, so the temperature control device is omitted in FIG. 22(A) to (G).

To from the first lens $L_1$ and the third lens $L_3$ of UV curable resin, the junction type compound lens manufacturing device is designed so the ultraviolet can be irradiated onto the UV curable resin from the above area of the die 20 and the die 30.

The invention claimed is:

1. An imaging lens, comprising a first diaphragm, a first junction type compound lens, a second diaphragm and a second junction type compound lens, wherein
said first diaphragm, said first junction type compound lens, said second diaphragm and said second junction type compound lens are arranged in this sequence from an object side to an image side,
said first junction type compound lens comprises a first lens, a second lens and a third lens arranged in this sequence from the object side to the image side,
said second junction type compound lens comprises a fourth lens, a fifth lens and a sixth lens arranged in this sequence from the object side to the image side,
said first lens, said third lens, said fourth lens and said sixth lens are formed of a curable resin material,
said second lens and said fifth lens are formed of a high softening temperature glass material,
said first lens and said second lens are directly bonded, said second lens and said third lens are directly bonded, said fourth lens and said fifth lens are directly bonded, and said fifth lens and said sixth lens are directly bonded, and the following conditions (1)-(8) are satisfied, $$0 \leq |N_3 - N_2| \leq 0.1 \quad (1)$$

$$0 \leq |N_3 - N_4| \leq 0.1 \quad (2)$$

$$0 \leq |v_3 - v_2| \leq 30.0 \quad (3)$$

$$0 \leq |v_3 - v_4| \leq 30.0 \quad (4)$$

$$0 \leq |N_9 - N_8| \leq 0.1 \quad (5)$$

$$0 \leq |N_9 - N_{10}| \leq 0.1 \quad (6)$$

$$0 \leq |v_9 - v_8| \leq 30.0 \quad (7)$$

$$0 \leq |v_9 - v_{10}| \leq 30.0 \quad (8)$$

where
$N_2$: refractive index of said first lens
$N_3$: refractive index of said second lens
$N_4$: refractive index of said third lens
$v_2$: Abbe number of said first lens
$v_3$: Abbe number of said second lens
$v_4$: Abbe number of said third lens
$N_8$: refractive index of said fourth lens
$N_9$: refractive index of said fifth lens
$N_{10}$: refractive index of said sixth lens
$v_8$: Abbe number of said fourth lens
$v_9$: Abbe number of said fifth lens
$v_{10}$: Abbe number of said sixth lens.

2. The imaging lens according to claim 1, wherein
said second lens is a plane parallel glass plate,
said first lens is a plano-convex lens where the object side face of said first lens is a convex surface facing the object side on a paraxial line,
said third lens is a plano-concave lens where the image side face of said third lens is a concave surface facing the image side on a paraxial line,
said fifth lens is a plane parallel glass plate,
said fourth lens is a plano-convex lens where the object side face of said fourth lens is a convex surface facing the object side on a paraxial line, and
said sixth lens is a plano-concave lens where the image side face of said sixth lens is a concave surface facing the image side on a paraxial line.

3. The imaging lens according to claim 2, wherein the object side face of said first lens and the image side face of said third lens are aspheric, and the object side face of said fourth lens and the image side face of said sixth lens are aspheric.

4. The imaging lens according to claim 2, wherein said curable resin material is a transparent curable silicone resin containing a transparent adhesive.

5. The imaging lens according to claim 1, wherein
said second lens is a bi-convex lens,
said first lens is a lens where the object side face of said first lens is a convex surface facing the object side on a paraxial line,
said third lens is a lens where the image side face of said third lens is a concave surface facing the image side on a paraxial line,
said fifth lens is a bi-concave lens,
said fourth lens is a lens where the object side face of said fourth lens is a convex surface facing the object side on a paraxial line, and
said sixth lens is a lens where the image side face of said sixth lens is a concave surface facing the image side on a paraxial line.

6. The imaging lens according to claim 5, wherein the object side face of said first lens and the image side face of said third lens are aspheric, and the object side face of said fourth lens and the image side face of said sixth lens are aspheric.

7. The imaging lens according to claim 5, wherein said curable resin material is a transparent curable silicone resin containing a transparent adhesive.

8. The imaging lens according to claim 1, wherein
said second lens is a meniscus lens of which convex surface faces the object side,
said first lens is a lens where the object side face of said first lens is a convex surface facing the object side on a paraxial line,
said third lens is a lens where the image side face of said third lens is a concave surface facing the image side on a paraxial line,
said fifth lens is a meniscus lens of which convex surface faces the image side,
said fourth lens is a lens where the object side face of said fourth lens is a convex surface facing the object side on a paraxial line, and
said sixth lens is a lens where the image side face of said sixth lens is a concave surface facing the image side on a paraxial line.

9. The imaging lens according to claim 8, wherein the object side face of said first lens and the image side face of said third lens are aspheric, and the object side face of said fourth lens and the image side face of said sixth lens are aspheric.

10. The imaging lens according to claim 8, wherein said curable resin material is a transparent curable silicone resin containing a transparent adhesive.

11. The imaging lens according to claim 1, wherein
said second lens is a bi-concave lens,
said first lens is a lens where the object side face of said first lens is a convex surface facing the object side on a paraxial line, said third lens is a lens where the image side face of said third lens is a concave surface facing the image side on a paraxial line, said fifth lens is a bi-convex lens, said fourth lens is a lens where the object side face of said fourth lens is a convex surface facing the object side on a paraxial line, and said sixth lens is a lens where the image side face of said sixth lens is a concave surface facing the image side on a paraxial line.

12. The imaging lens according to claim 11, wherein the object side face of said first lens and the image side face of said third lens are aspheric, and the object side face of said fourth lens and the image side face of said sixth lens are aspheric.

13. The imaging lens according to claim 11, wherein said curable resin material is a transparent curable silicone resin containing a transparent adhesive.

14. The imaging lens according to claim 1, wherein the object side face of said first lens and the image side face of said third lens are aspheric, and the object side face of said fourth lens and the image side face of said sixth lens are aspheric.

15. The imaging lens according to claim 1, wherein said curable resin material is a transparent curable silicone resin containing a transparent adhesive.

16. An imaging lens, comprising a first diaphragm, a first junction type compound lens, a second diaphragm, and a second junction type compound lens, wherein said first diaphragm, said first junction type compound lens, said second diaphragm, and said second junction type compound lens are arranged in this sequence from an object side to an image side, said first junction type compound lens comprises a first lens, a second lens and a third lens arranged in this sequence from the object side to the image side, said second junction type compound lens comprises a fourth lens, a fifth lens and a sixth lens arranged in this sequence from the object side to the image side, said first lens, said third lens, said fourth lens and said sixth lens are formed of a curable resin material, said second lens and said fifth lens are formed of a high softening temperature glass material, said first lens and said second lens are directly bonded, said second lens and said third lens are directly bonded, said fourth lens and said fifth lens are directly bonded, and said fifth lens and said sixth lens are directly bonded, said second lens is a bi-convex lens, said first lens is a lens where the object side face of said first lens is a convex surface facing the object side on a paraxial line, said third lens is a lens where the image side face of said third lens is a concave surface facing the image side on a paraxial line, said fifth lens is a bi-concave lens, said fourth lens is a lens where the object side face of said fourth lens is a convex surface facing the object side on a paraxial line, and said sixth lens is a lens where the image side face of said sixth lens is a concave surface facing the image side on a paraxial line.

17. The imaging lens according to claim 16, wherein the object side of said first lens and the image side of said third lens are aspheric, and the object side face of said fourth lens and the image side face of said sixth lens are aspheric.

18. The imaging lens according to claim 16, wherein said curable resin material is a transparent curable silicone resin containing a transparent adhesive.

19. An imaging lens, comprising a first diaphragm, a first junction type compound lens, a second diaphragm, and a second junction type compound lens, wherein said first diaphragm, said first junction type compound lens, said second diaphragm and said second junction type compound lens are arranged in this sequence from an object side to an image side, said first junction type compound lens comprises a first lens, a second lens and a third lens arranged in this sequence from the object side to the image side, said second junction type compound lens comprises a fourth lens, a fifth lens and a sixth lens arranged in this sequence from the object side to the image side, said first lens, said third lens, said fourth lens and said sixth lens are formed of a curable resin material, said second lens and said fifth lens are formed of a high softening temperature glass material, said first lens and said second lens are directly bonded, said second lens and said third lens are directly bonded, said fourth lens and said fifth lens are directly bonded, and said fifth lens and said sixth lens are directly bonded, said second lens is a meniscus lens of which convex surface faces the object side, said first lens is a lens where the object side face of said first lens is a convex surface facing the object side on a paraxial line, said third lens is a lens where the image side face of said third lens is a concave surface facing the image side on a paraxial line, said fifth lens is a meniscus lens of which convex surface faces the image side, said fourth lens is a lens where the object side face of said fourth lens is a convex surface facing the object side on a paraxial line, and said sixth lens is a lens where the image side face of said sixth lens is a concave surface facing the image side on a paraxial line.

20. The imaging lens according to claim 19, wherein the object side face of said first lens and the image side face of said third lens are aspheric, and the object side face of said fourth lens and the image side face of said sixth lens are aspheric.

21. The imaging lens according to claim 19, wherein said curable resin material is a transparent curable silicone resin containing a transparent adhesive.

22. An imaging lens, comprising a first diaphragm, a first junction type compound lens, a second diaphragm, and a second junction type compound lens, wherein said first diaphragm, said first junction type compound lens, said second diaphragm and said second junction type compound lens are arranged in this sequence from an object side to an image side, said first junction type compound lens comprises a first lens, a second lens and a third lens arranged in this sequence from the object side to the image side, said second junction type compound lens comprises a fourth lens, a fifth lens and a sixth lens arranged in this sequence from the object side to the image side, said first lens, said third lens, said fourth lens and said sixth lens are formed of a curable resin material, said second lens and said fifth lens are formed of a high softening temperature glass material, said first lens and said second lens are directly bonded, said second lens and said third lens are directly bonded, said fourth lens and said fifth lens are directly bonded, and fifth lens and said sixth lens are directly bonded, said second lens is a bi-concave lens, said first lens is a lens where the object side face of said first lens is a convex surface facing the object side on a paraxial line, said third lens is a lens where the image side face of said third lens is a concave surface facing the image side on a paraxial line, said fifth lens is a bi-convex lens, said fourth lens is a lens where the object side face of said fourth lens is a convex surface facing the object side on a paraxial line, and said sixth lens is a lens where the image side face of said sixth lens is a concave surface facing the image side on a paraxial line.

23. The imaging lens according to claim 22, wherein the object side face of said first lens and the image side face of said third lens are aspheric, and the object side face of said fourth lens and the image side face of said sixth lens are aspheric.

24. The imaging lens according to claim 22, wherein said curable resin material is a transparent curable silicone resin containing a transparent adhesive.

* * * * *

UNITED STATES PATENT AND TRADEMARK OFFICE
CERTIFICATE OF CORRECTION

| | | |
|---|---|---|
| PATENT NO. | : 7,768,720 B2 | Page 1 of 1 |
| APPLICATION NO. | : 11/921174 | |
| DATED | : August 3, 2010 | |
| INVENTOR(S) | : Satoshi Do | |

It is certified that error appears in the above-identified patent and that said Letters Patent is hereby corrected as shown below:

At column 23, lines 57-64 delete the following:

"The ordinates of the aberration curves in Fig. 19 and Fig. 20 show the image height by a % of the distance from the optical axis. In Fig. 19 and Fig. 20, 100% corresponds to 0.600 mm. The ordinate of the aberration curve in Fig. 21 shows the incident height h (F number), and the maximum thereof corresponds to 2.9. The abscissa of Fig. 19 shows the aberration (%), and the abscissas of Fig. 20 and Fig. 21 show the value of the aberration."

Signed and Sealed this

Twelfth Day of October, 2010

David J. Kappos
*Director of the United States Patent and Trademark Office*